US011347061B2

(12) United States Patent
Bierhuizen et al.

(10) Patent No.: US 11,347,061 B2
(45) Date of Patent: May 31, 2022

(54) COMPACT EYE TRACKING USING FOLDED DISPLAY OPTICS

(71) Applicant: GOOGLE LLC, Mountain View, CA (US)

(72) Inventors: Serge Bierhuizen, San Jose, CA (US); Hayes S. Raffle, Palo Alto, CA (US); Xinda Hu, Sunnyvale, CA (US); Jerome Carollo, San Francisco, CA (US); Yi Qin, Mountain View, CA (US); Oscar Martinez, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 222 days.

(21) Appl. No.: 16/718,533

(22) Filed: Dec. 18, 2019

(65) Prior Publication Data

US 2020/0124857 A1 Apr. 23, 2020

Related U.S. Application Data

(62) Division of application No. 15/902,811, filed on Feb. 22, 2018, now Pat. No. 10,545,347.
(Continued)

(51) Int. Cl.
*G02B 27/00* (2006.01)
*G02B 27/01* (2006.01)
(Continued)

(52) U.S. Cl.
CPC .......... *G02B 27/0172* (2013.01); *G02B 5/20* (2013.01); *G02B 13/0055* (2013.01);
(Continued)

(58) Field of Classification Search
CPC ........ G02B 5/208; G02B 5/20; G02B 5/3025; G02B 13/0055; G02B 17/0856;
(Continued)

(56) References Cited

U.S. PATENT DOCUMENTS 3,682,532 A 8/1972 Myles
3,940,203 A 2/1976 La
(Continued)

FOREIGN PATENT DOCUMENTS

CN 102955255 A 3/2013
CN 105518514 A 4/2016
(Continued)

OTHER PUBLICATIONS

International Search Report and Written Opinion Received for PCT Application No. PCT/US2016/066540, dated Apr. 7, 2017, 10 pages.
(Continued)

*Primary Examiner* — Jordan M Schwartz
(74) *Attorney, Agent, or Firm* — Brake Hughes Bellermann LLP

(57) ABSTRACT

Optical assemblies for use in virtual and augmented reality environments are described. The optical assemblies may include lenses, filter stacks, cameras, and image projecting devices. For example, the optical assemblies may include at least one lens, a first filter stack between the at least one lens and an image projecting device, a second filter stack between the first filter stack and the image projecting device, and a camera configured to capture images of an infrared reflection of light through the at least one lens.

14 Claims, 23 Drawing Sheets

Related U.S. Application Data

(60) Provisional application No. 62/462,584, filed on Feb. 23, 2017.

(51) Int. Cl.
  *G02B 27/09*   (2006.01)
  *G02B 5/20*    (2006.01)
  *G02B 5/30*    (2006.01)
  *G06F 3/01*    (2006.01)
  *G02B 13/00*   (2006.01)
  *G02B 17/08*   (2006.01)

(52) U.S. Cl.
  CPC ..... *G02B 17/0856* (2013.01); *G02B 27/0093* (2013.01); *G02B 27/0101* (2013.01); *G02B 27/0955* (2013.01); *G06F 3/013* (2013.01); *G02B 5/208* (2013.01); *G02B 5/3025* (2013.01); *G02B 2027/0138* (2013.01); *G02B 2027/0178* (2013.01)

(58) Field of Classification Search
  CPC ............ G02B 27/0172; G02B 27/0955; G02B 27/0093; G02B 27/0101; G02B 27/017; G02B 2027/0178; G02B 2027/0138; G06F 3/013
  See application file for complete search history.

(56) References Cited

U.S. PATENT DOCUMENTS

| | | | |
|---|---|---|---|
| 4,163,542 A | 8/1979 | La | |
| 4,867,551 A | 9/1989 | Perera | |
| 5,654,828 A | 8/1997 | Togino et al. | |
| 5,886,822 A | 3/1999 | Spitzer | |
| 6,091,546 A | 7/2000 | Spitzer | |
| 6,144,439 A | 11/2000 | Carollo | |
| 6,271,969 B1 | 8/2001 | Mertz | |
| 6,421,183 B1 | 7/2002 | Ophey | |
| 6,487,021 B1 * | 11/2002 | Ophey | G02B 27/0172 359/631 |
| 6,853,491 B1 | 2/2005 | Ruhle et al. | |
| 8,472,120 B2 | 6/2013 | Border et al. | |
| 8,477,425 B2 | 7/2013 | Border et al. | |
| 8,488,246 B2 | 7/2013 | Border et al. | |
| 8,998,414 B2 | 4/2015 | Bohn | |
| 9,134,534 B2 | 9/2015 | Border et al. | |
| 9,507,066 B2 | 11/2016 | Kollin et al. | |
| 9,555,589 B1 | 1/2017 | Ambur et al. | |
| 10,095,036 B2 | 10/2018 | Carollo et al. | |
| 10,133,074 B2 | 11/2018 | Carollo et al. | |
| 10,852,556 B1 | 12/2020 | Ouderkirk | |
| 2002/0024743 A1 | 2/2002 | Endo et al. | |
| 2002/0159150 A1 | 10/2002 | King et al. | |
| 2006/0232862 A1 | 10/2006 | Steven et al. | |
| 2012/0147465 A1 | 6/2012 | Ruhle et al. | |
| 2012/0212400 A1 | 8/2012 | Border et al. | |
| 2013/0207887 A1 * | 8/2013 | Raffle | G06F 3/013 345/156 |
| 2015/0049390 A1 | 2/2015 | Lanman et al. | |
| 2015/0130687 A1 | 5/2015 | Kitamura et al. | |
| 2015/0268474 A1 | 9/2015 | Cheng et al. | |
| 2015/0378074 A1 | 12/2015 | Kollin et al. | |
| 2016/0018639 A1 | 1/2016 | Spitzer et al. | |
| 2016/0147074 A1 | 5/2016 | Kobayashi et al. | |
| 2016/0363770 A1 | 12/2016 | Kim et al. | |
| 2016/0363995 A1 | 12/2016 | Rougeaux | |
| 2017/0227770 A1 | 8/2017 | Carollo et al. | |
| 2017/0227777 A1 | 8/2017 | Carollo et al. | |
| 2018/0107000 A1 | 4/2018 | Sung et al. | |
| 2018/0203505 A1 * | 7/2018 | Trail | G02B 27/0093 |
| 2018/0218211 A1 * | 8/2018 | Ishioka | G02B 27/0172 |

FOREIGN PATENT DOCUMENTS

| | | |
|---|---|---|
| EP | 1008886 A1 | 6/2000 |
| EP | 1096293 A2 | 5/2001 |
| EP | 2499960 A1 | 9/2012 |
| JP | 2000180785 A | 6/2000 |
| JP | 2000511306 A | 8/2000 |
| JP | 2001356295 A | 12/2001 |
| JP | 2002107655 A | 4/2002 |
| JP | 2013186230 A | 9/2013 |
| KR | 20010073072 A | 7/2001 |
| WO | 2012058652 A2 | 5/2012 |
| WO | 2013/049012 A1 | 4/2013 |
| WO | 2015/157482 A1 | 10/2015 |
| WO | 2015198477 A1 | 12/2015 |
| WO | 2015198502 A1 | 12/2015 |
| WO | 2016157485 A1 | 10/2016 |
| WO | 2017/136042 A1 | 8/2017 |
| WO | 2017/136043 A1 | 8/2017 |

OTHER PUBLICATIONS

International Search Report and Written Opinion for PCT Application No. PCT/US2018/019500, dated Jul. 2, 2018, 21 pages.
International Search Report and Written Opinion Received for PCT/US2016/66550, dated May 4, 2017, 18 pages.

* cited by examiner

COMPACT EYE TRACKING USING FOLDED DISPLAY OPTICS

CROSS REFERENCE TO RELATED APPLICATIONS

This application is a divisional application of U.S. application Ser. No. 15/902,811, filed Feb. 22, 2018, which claims the benefit of U.S. Provisional Application No. 62/462,584, filed on Feb. 23, 2017, the disclosures of which are incorporated herein by reference in their entireties.

TECHNICAL FIELD

This description generally relates to optical eye tracking technology used in interactive head-mounted display (HMD) devices.

BACKGROUND

Designing head-mounted display (HMD) devices that are both sleek and optically powerful can be hindered by a number of challenges. The optical components used to provide quality content and content processing can be extensive, leading to a bulky HMD device. The optical components can also increase the weight of the HMD device, which can make use of the device difficult for a user and can cause fatigue when a user wears the device. These issues can cause the user to discontinue use of the HMD device.

SUMMARY

In one general aspect, a system is described that includes a head-mounted display assembly. The head-mounted display assembly may include an image projecting device operable to display image content to at least one eye-piece in the head-mounted display assembly and an optical assembly. The optical assembly may include at least one lens and a first filter stack disposed between the at least one lens and the image projecting device, the first filter stack including at least one beam splitting layer. The optical assembly may also include a second filter stack between the first filter stack and the image projecting device, the second filter stack including at least one reflective element that faces the at least one lens.

The head-mounted display assembly also includes a camera placed within the head mounted display assembly, the camera being configured to capture images of an infrared reflection of light through the at least one lens. In some implementations, the camera is placed beneath the at least one lens and aimed toward the image projecting device to capture an image of an eye of a user accessing the head-mounted display assembly and the image of the eye is reflected from the reflective element. In some implementations, the camera is placed beneath the at least one image projecting device and aimed toward the at least one lens to capture an image of an eye of a user accessing the head-mounted display assembly. The image of the eye may be captured using the camera through the at least one lens, the first filter stack and the second filter stack.

In some implementations, the at least one lens is configured to slide laterally relative to a bottom plane of a frame housing the head-mounted display assembly. The slide may be configured to trigger a diopter adjustment to correct a visual impairment associated with a user accessing the head-mounted display assembly. In some implementations, the reflective element is an infrared (IR) filter coating on a side of the image projecting device facing the at least one lens. In some implementations, the reflective element is a prism.

In some implementations, a plurality of light sources are placed in a perimeter surrounding the at least one lens. The one or more light sources may be configured to direct light to an eye of a user accessing the head-mounted display assembly. The reflective element may be configured to receive a portion of the light reflected from the eye at the reflective element and reflect an infrared wavelength of the portion to the camera. In some implementations, the plurality of light sources include a plurality of light emitting diodes placed facing an eye of a user accessing the head mounted display assembly and placed in a perimeter surrounding the at least one lens.

In some implementations, the first filter stack is adjacent to the second filter stack and configured into a stacked arrangement between the at least one lens and a display panel. In such implementations, the first filter stack may include a first linear polarizer, stacked between the display panel and a first quarter wave plate, the first quarter wave plate stacked between the first linear polarizer and a beam splitter and the second filter stack may include a polarizing beam splitter stacked between a second quarter wave plate stacked after the beam splitter and a polarizing beam splitter. The polarizing beam splitter may be stacked between the second quarter wave plate and a second linear polarizer and the second linear polarizer may include the reflective element in a filter stack layer that faces the at least one lens. Other embodiments of this aspect include corresponding computer systems, apparatus, and computer programs recorded on one or more computer storage devices, each configured to perform actions using the systems.

In another general aspect, an optical assembly may include a filter stack assembly configured to fold an optical path of light transmitted therethrough. The filter stack assembly may include at least one partially transmissive lens, a first filter including at least one infrared filter layer coupled to a first side of a polarizing beam splitter layer, the polarizing beam splitter layer being coupled, on a second side of the polarizing beam splitter layer, to a first quarter wave plate layer, and a second filter including a second quarter wave plate coupled to a linear polarizer, the second filter being curved on a first side to be coupled to a curved lens, and having a second side coupled to the linear polarizer. A first side of the at least one infrared filter layer may include the at least one partially transmissive lens. The optical assembly may also include a display assembly with a first edge coupled to a top edge of the filter stack assembly and a camera configured to capture images of a reflection received through the filter stack assembly.

In some implementations, the optical assembly may also include at least one circular polarization filter placed in a line of sight from the camera to the filter stack assembly and the at least one circular polarization filter may be configured to improve infrared image contrast and minimize infrared ghost imagery. In some implementations, the camera is positioned beneath the filter stack assembly and aimed to capture the images.

In some implementations, a second edge of the display assembly is coupled to the top edge of a visor having an infrared filter layer. The visor may be disposed parallel to the filter stack assembly and perpendicular to the display assembly. The camera may be configured to capture images of a reflection received through the filter stack assembly and reflected from the visor.

In some implementations, the optical assembly is configured to display augmented reality content. For example, to display augmented reality content, the filter stack assembly may be transparent and the camera may be configured to capture images of an eye of a user accessing a head-mounted display housing the optical assembly. The captured images may be provided to at least one processor communicably coupled to the optical assembly to perform eye tracking through the filter stack assembly.

In another general aspect, a head-mounted display system may include at least one processor a filter stack assembly configured to fold an optical path of light transmitted therethrough, a display device in which a first edge of the display device is coupled to a top edge of the filter stack assembly and perpendicular to the filter stack assembly and a second edge of the display device is coupled to a first edge of an angled beam splitter filter, the first edge of the beam splitter filter being tilted at an angle to the filter stack assembly, the second edge of the beam splitter filter being coupled to a bottom edge of the filter stack assembly. The head-mounted display system may also include a camera disposed in the head-mounted display system above the display device.

The filter stack assembly may include at least one partially transmissive lens, a first filter including at least one infrared filter layer coupled to a first side of a polarizing beam splitter layer, the polarizing beam splitter layer being coupled, on a second side of the polarizing beam splitter layer, to a first quarter wave plate layer, and a second filter including a second quarter wave plate coupled to a linear polarizer. The second filter may be curved on a first side to be coupled to a curved lens, and on a second side to be coupled to the linear polarizer. A first side of the at least one infrared filter layer may include the at least one partially transmissive lens.

In some implementations, the camera is configured to capture images of a reflection received through the filter stack assembly from the beam splitter filter and through the display device. In some implementations, the camera provides images to the at least one processor for performing tracking of eye movements of a user accessing the head-mounted display system. In some implementations, the camera is an infrared camera capturing a field of view of about 40 degrees. In some implementations, the beam splitter filter is tilted at an angle of about 45 degrees to the optical axis of the at least one partially transmissive lens.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
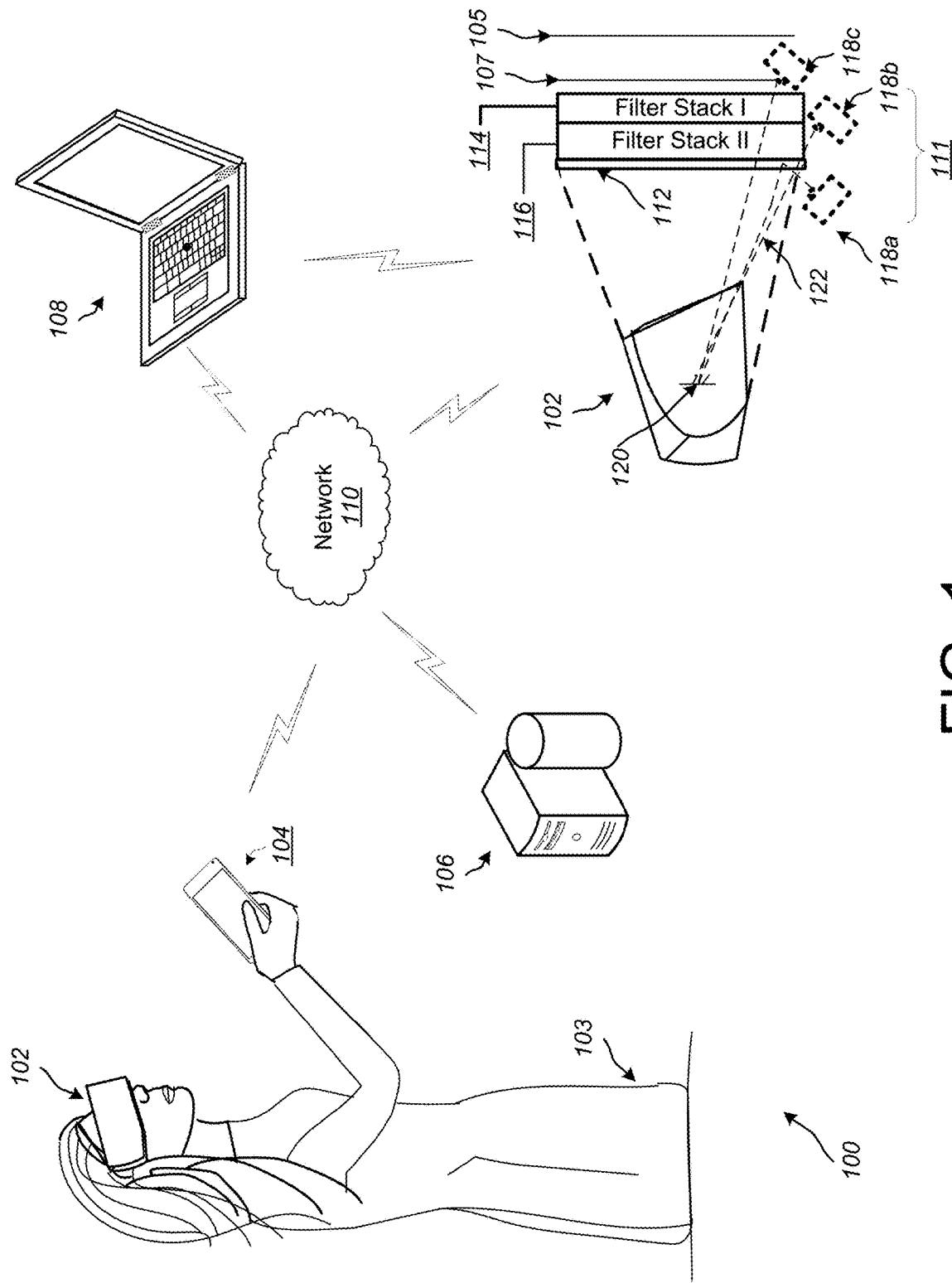
FIG. 1 is a block diagram of an example system for rendering image content in a head-mounted display (HMD).

Accessing virtual reality (VR) content generally includes having a user wear a head-mounted display (HMD) device that can be operated with a number of accessories or computing devices configured to provide an immersive VR or augmented reality (AR) environment (also can be referred to, respectively, as a VR space or an AR space). Such HMD devices can include optical components that provide eye tracking, magnification, polarization, filtering, vision correction, and/or image processing. The systems and methods described in this disclosure may include using optical components to provide the advantage of reducing the size of an optical assembly housed in the HMD device while providing accurate and compact eye tracking. The accurate and compact eye tracking can be provided using at least one camera placed near (or within) the optical assembly. The camera(s) can capture images of one or both eyes of the user directly or via reflection off of another surface in the optical assembly, for example. The captured images can be used for implementing eye tracking in a virtual reality environment as well as in an augmented reality environment.

In some implementations, the systems and methods described in this disclosure may provide accurate eye tracking by using an optical assembly utilizing a folded optical path. The folded optical path can be accomplished using one or more reflective elements to assist in capturing images of the eye. One example reflective element includes an infrared (IR) filter on a flat side of a polarizer, on a display panel, against a display device, or otherwise placed within the optical components described herein. Another example reflective element includes a prism element placed within the optical assembly. In some implementations, the reflective element may be a partially reflective layer such as an IR film placed upon the polarizer. Such reflective elements can be used in combination with filters and/or an infrared (IR) camera placed beneath a lens in the optical assembly.

In some implementations, the IR camera may capture an image of the eye through the lens. Such an optical assembly configuration can provide an advantage of reducing an angle at which the camera is capturing an image of the eye. For example, the IR camera may be placed at a smaller angle compared to an example in which the same camera may capture an image of the eye directly from the same mechanical position within the optical assembly. The angle of placement of the camera viewing eye images through the lens may be less than the angle of placement of the camera in the example in which the camera does not view the eye through the lens. This enables the camera to be placed within the optical assembly rather than outside of the optical assembly to capture the images within a field of view of a lens integrated in the HMD device as part of the optical assembly.

The systems and methods described in this disclosure can also provide an advantage of reducing the size of the optical assembly housed in the HMD device may be, in part, based on integrating the optical assembly (that includes folded-optical components) into the HMD device. In particular, reducing the size of the optical assembly can allow reduction of the display space within the HMD device, thereby reducing the size and weight of the HMD device when worn by the user. The reduced size and weight of the HMD device may provide the advantage of further integrating the user into a virtual reality environment because wearing a lighter weight and/or smaller device can reduce the awareness of a user wearing the HMD device while accessing the virtual reality environment. A reduction in awareness of wearing the HMD device can encourage a realistic and immersive experience in the VR space.

In some implementations, the IR camera can be used with an optical assembly in which the optical elements can slide back and forth laterally to provide diopter adjustment for a user accessing the HMD device. In this example, the IR camera may be optically coupled to the edge of a lens (e.g., using a bonded prismatic element). In general, the IR camera can be used in combination with IR filters to perform accurate eye tracking and head tracking of a user accessing the HMD device while providing improved vision of virtual content for the user.

In general, the systems and methods described herein may include using optical assemblies and optical methods to reduce HMD device thickness while taking advantage of lens systems and eye tracking systems that interact and integrate well with mobile computing device displays. In some implementations, the optical assemblies and methods can employ at least two polarization filter stacks (for at least one eyepiece or for each of a left and right eyepiece) to fold the optical path between a long focal length magnifying lens and a display panel.

Reducing the lens display space in this fashion can function to move the HMD device center of gravity closer to the head of the user wearing the device, thereby reducing the moment of inertia of the user. The reduced lens display space can additionally provide aesthetic advantages resulting in a streamlined, low-profile HMD device with accurate eye tracking.

In some implementations, the systems and methods described in this disclosure may utilize hybrid optical assemblies and optical methods to achieve a compact near-eye display (e.g., within an HMD device) and eye tracking technology for virtual reality systems. The hybrid optical assemblies can include inline structures that employ additional optical elements with two or more filter stacks including, but not limited to polarizers, cameras, prisms, lenses, and the like.

Referring to FIG. 1, a virtual reality (VR) system and/or an augmented reality (AR) system may include, for example, an HMD device 102 or similar device worn by a user 103, on a head of the user, to generate an immersive virtual world environment to be experienced by the user. The HMD device 102 may represent a virtual reality headset, glasses, one or more eyepieces, or other wearable device capable of displaying VR content. In operation, the HMD device 102 can execute a VR application (not shown) which can playback received and/or processed images to a user.

FIG. 1 is a diagram that illustrates a system 100 with a user interacting with content on a mobile computing device 104. In the example shown in FIG. 1, the user may be accessing content (e.g., images, audio, video, streaming content, etc.) via mobile computing device 104 to HMD device 102. In some implementations, one or more content servers (e.g., server 106) and one or more computer-readable storage devices can communicate with the mobile computing device 104 using a network 110 to provide the content to the mobile computing device 104, which may feed the content to HMD device 102. The content can be stored on the mobile computing device 104 or another computing device.

In the example implementation shown in FIG. 1, the user 103 is wearing the HMD device 102 and holding mobile computing device 104. Movement of the user in the real world environment may be translated into corresponding movement in the virtual world environment using sensors and software on the mobile computing device 104. In some implementations, the mobile computing device can be interfaced to/connected to the HMD device 102. In some implementations, the mobile computing device 104 can execute a VR and/or AR application.

The mobile computing device 104 may interface with a computer-generated, 3D environment in a VR and/or AR environment. In these implementations, the HMD device 102 includes a screen 105, at least one display panel 107, and at least one optical assembly 111 that includes at least a lens 112, a filter stack 114, a filter stack 116, and a camera 118a (or 118b or 118c). The lens 112 may be provided to alter images provided by screen 105 so that a user wearing the HMD device may view content properly. For example, the lens 112 may be configured to alter the location in which light is provided through the lens to the eye of the user wearing the HMD device. The lens 112 can modify and/or correct an angle of light received at the lens and provided from the lens to the eye of the user so that the eye can view images properly. For example, the lens 112 can focus light to a single point in the back of the eye of the user to keep particular images in focus.

The filter stacks 114 and 116 may be provided to fold the optical path of light received at the filter stack 114 from a display device (e.g., housing screen 105). The folded optical path may provide the advantage of enabling camera placement for capturing images of an eye of a user at an angle at which the camera can capture images of the eye within the field of view of the lens 112.

As described herein, respective filter stacks 114 and 116 may be included in optical assemblies for each eyepiece in the HMD device 102. In some implementations, the filter stacks 114 and 116 may be combined into a single filter stack. In some implementations, other optical elements may be disposed between, coated upon, laminated on, or otherwise coupled or affixed to the filter stack 114 and/or the filter stack 116.

Various implementations described herein utilize a camera placed at different locations within a particular optical assembly. Accordingly, the placement of camera 118a may vary to include the placement shown by camera 118b or camera 118c. Other camera placement locations are possible, some of which are depicted in various other figures described herein.

As shown in FIG. 1, at least one camera 118a (or 118b or 118c) may be placed as part of the optical assembly 111 in device 102. The camera 118a may be, for example, an IR camera sensitive to infrared light and configured to capture an IR view of one or both eyes of a user accessing HMD device 102. In particular, camera 118a can be placed to capture an image of a reflection of the eye (e.g., shown by line 120), where light that forms the image captured by the camera 118a passes through lens 112 and is reflected off filter stack 116. Accordingly, the IR camera 118a can image the eye of a user within the actual field of view of virtual reality lens 112, as shown by arrow 122.

The mobile computing device 104 may be a portable electronic device, such as, for example, a smartphone, or other portable handheld electronic device that may be paired with, or operably coupled with, and communicate with, the HMD device 102 via, for example, a wired connection, or a wireless connection such as, for example, a Wi-Fi or Bluetooth connection. This pairing, or operable coupling, may provide for communication and exchange of data between the mobile computing device 104 and the HMD device 102. Alternatively, a server device 106 or local computer 108 (or other device accessible by the user) may function to control HMD device 102 via network 110.

In some implementations, the HMD device 102 can connect to/communicate with the mobile computing device 104 (or other device 106, 108, etc.) using one or more high-speed wired and/or wireless communications protocols (e.g., Wi-Fi, Bluetooth, Bluetooth Low Energy (LE), Universal Serial Bus (USB), USB 3.0, USB Type-C, etc.). In addition, or in the alternative, the HMD device 102 can connect to/communicate with the mobile computing device using an audio/video interface such as High-Definition Multimedia Interface (HDMI). In some implementations, the content displayed to the user on the screen included in the HMD device 102 may also be displayed on a display device that may be included in device 106 and/or 108. This allows someone else to see what the user may be interacting with in the VR and/or AR space.

In the example system 100, the devices 104, 106, and 108 may include a laptop computer, a desktop computer, a mobile computing device, or a gaming console. In some implementations, the device 104 can be mobile computing device that can be disposed (e.g., placed/located) within the HMD device 102. The mobile computing device 104 can include a display device that can be used as the screen 105 for the HMD device 102, for example. Devices 102, 104, 106, and 108 can include hardware and/or software for executing a VR and/or AR application. In addition, devices 102, 104, 106, and 108 can include hardware and/or software that can recognize, monitor, and track 3D movement of the HMD device 102, when these devices are placed in front of or held within a range of positions relative to the HMD device 102. In some implementations, devices 104, 106, and 108 can provide additional content to HMD device 102 over network 110. In some implementations, devices 102, 104, 106, and 108 can be connected to/interfaced with one or more of each other either paired or connected through network 110. The connection can be wired or wireless.

In some implementations, the network 110 can be a public communications network (e.g., the Internet, cellular data network, modems over a telephone network, etc.) or a private communications network (e.g., private LAN, leased lines, etc.). In some implementations, the mobile computing device 104 can communicate with the network 110 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

The system 100 may include electronic storage. The electronic storage can include non-transitory storage media that stores information electronically. The electronic storage may be configured to store captured images, obtained images, pre-processed images, post-processed images, etc.

Figure 2:
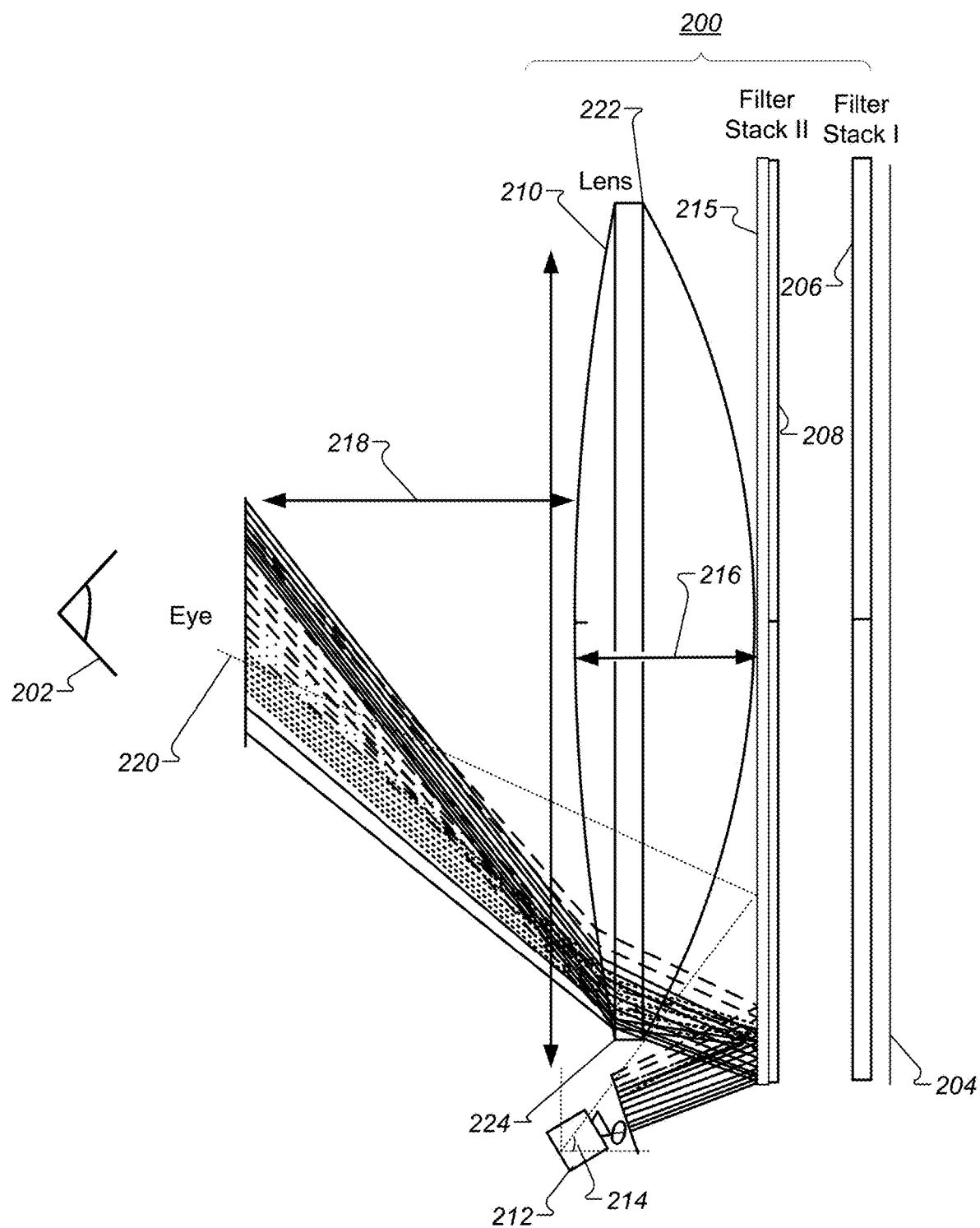
FIG. 2 is a block diagram depicting an example optical assembly.

FIG. 2 is a block diagram depicting an example optical assembly 200. The optical assembly 200 may be installed as part of an HMD device intended for accessing VR and/or AR content. As shown in FIG. 2, an eye 202 of a user is simulated to the left of the optical assembly 200, and a display panel 204 is shown to the right of the optical assembly 200. In some implementations, an optical assembly 200 may be included for each of a left and right eyepiece. In some implementations, the optical assembly 200 may be included in a single eyepiece.

The optical assembly 200 includes the display panel 204, a first filter stack 206 that includes a beam splitter (not shown), a second filter stack 208, and a lens 210. The optical assembly 200 can function to fold the optical path of light presented by display panel 204 (from screen 105, for example). For example, the optical path of light that is transmitted through the filter stacks 206 and 208 is folded two or more times between the two filter stacks 26 and 208. In this example, the filter stack 208 may include an infrared (IR) filter 215 on one side of a linear polarizer in the filter stack. The filter 215 can function to fold an optical path of light through the filter stack and lens and to the eye. For example, the systems described herein can provide eye tracking using a folded optical path with an IR filter (e.g., filter 215) on a filter stack (e.g., a filter stack 208). In one example, the filter 215 may be coated on a side of a polarizer within the stack 208 facing the lens 210.

The optical assembly 200 may also include a camera 212 placed beneath or beside a lens such that the camera can capture an image of a user's eye 202 through the lens. In the depicted examples described throughout this disclosure, the camera may be an IR camera placed to capture an IR image of the eye of the user within the field of view of the lens. The placement of camera 212 may ensure that accurate eye tracking capabilities are maintained while the HMD device can be crafted in a reduced footprint with respect to typical HMD devices. The reduced footprint can be accomplished by placing the camera 212 underneath the lens (e.g., adjacent to a bottom plane of the lens) such that the camera 212 captures reflections of the images of the eye. This may allow other optical components within assembly 200 to be seated in a smaller lateral footprint without concerns of occluding the camera view and without concern of placing the camera in a viewable location to the user.

The IR filter 215 may be an optical filter including a number of thinly deposited film layers on one side of filter stack 208. The IR filter 215 may be operable to reflect light to attenuate or enhance an image. For example, the filter 215 can reflect light to enable the camera 212 to capture an enhanced image of the eye of the user. In one example, the materials of the IR filter 215 may include combinations of Nickel (or other reflective material) coated on a substrate of Zinc Selenide (ZnSe), for example.

One example of the optical assembly 200 may include the camera 212 placed adjacent to a bottom plane of the lens 210. Although camera 212 is shown below and slightly left of lens 210, other camera locations are possible. For example, the camera 212 can be placed below lens 210 in a location in which the camera 212 can capture a reflection of an image of the eye 202 from IR filter 215. In an example, the camera can be placed to capture a reflection and can be tilted or angled at an angle of about zero degrees to about 45 degrees from the optical axis of the lens 210. Angle 214 shows one example in which the camera 212 can capture a reflection of an image of the eye 202 from filter 215 through lens 210, as shown by path 220. For example, the vertical position (defined from a top 222 to a bottom 224 of the lens 210) of camera 212 can be selected such that a reflection of an image of the eye 202 can be reflected from IR filter 215 (e.g., coated on filter stack 208).

In some implementations, the lens 210 may have a thickness 216 of about 7 millimeters to about 11 millimeters. In some implementations, the lens 210 may have a thickness 216 of about 9 millimeters to about 10 millimeters. In some implementations, the lens 210 may have a diameter of about 35 millimeters to about 45 millimeters. In some implementations, the lens 210 may have a diameter of about 40 millimeters to about 50 millimeters. In some implementations, the eye relief distance 218 may be about 15 millimeters to about 17 millimeters. In some implementations, the eye relief distance 218 may be about 13 millimeters to about 18 millimeters. In some implementations, the eye relief distance 218 may be about 12 millimeters to about 14 millimeters. In some implementations, the eye relief distance 218 may be about 17 millimeters to about 21 millimeters. In some implementations, the aspherical prescription of lens 210 may include an r1 value of about 98.1 millimeters with a k1 value of 3.69. The lens 210 may also have an r2 value of about 41.7 millimeters and a k value of about −4.8. The lens 210 may also have an r4 value of about $1.1 \times 10-5$ and an r6 value of about $4.5 \times 10-9$. Other prescriptions are possible. In general, the r values (e.g., r1, r2, r4, and r6) represent example radial coordinate values for the lens 210. The values may be obtained by measuring distance perpendicularly from the optical axis of the lens 210. The k value (e.g., k1) may represent a conic constant for the lens 210.

In one example, the optical assembly 200 can be installed in a system that includes an interactive HMD device (e.g., device 102) worn by a user (e.g., user 103). The interactive HMD device may be adapted to house an image projecting device (e.g., device 204) and an optical assembly (e.g., 200). In some implementations, the image projecting device includes a display on a mobile computing device. In some implementations, the display may be an organic light emitting display (OLED). In other implementations, the display may be a liquid crystal display (LCD). In yet other implementations, the display may be a reflective display that includes a liquid crystal on silicon (LCOS) display. Other display technologies may be used, as described in detail below.

The optical assembly 200 may include at least one refracting lens 210. In some implementations, the at least one refracting lens 210 may have a focal length of about 30 millimeters to about 50 millimeters, while the distance between the lens and the display may be about 13 millimeters to about 20 millimeters due to the optical folding of the two filter stacks 206 and 208. In some implementations, the optical assembly 200 can include a plurality of refracting lenses or lens arrays.

In one example, the optical assembly 200 can be a head-mounted display assembly configured to be installed in an HMD device. The assembly 200 may include an image projecting device (e.g., display panel 204) operable to display image content to at least one eye-piece in the HMD device. For example, the assembly 200 can be installed for one or both eye pieces of the HMD device 102. The optical assembly 200 may include a first filter stack 206 including at least one surface coated with a beam splitting layer, a second filter stack 208, including at least one surface coated with a reflective element, at least one slidable (or fixed) lens 210, and a camera 214 configured to capture images of a reflection through the at least one slidable (or fixed) lens 210.

In some implementations, the assembly 200 may include a frame (as shown on HMD device 102) housing the camera, the reflective element (e.g., IR filter 215) or prism 814, and the at least one lens. The frame may be capable of sliding linearly along a first axis (e.g., a horizontal x-axis in an x-y plane) and circumferentially about a point on the first axis (e.g., arcuate movement about a point on the axis). In some implementations, the reflective element is an infrared (IR) filter coating (e.g., as shown at 215, 316, 412, 609, and 711). In some implementations, the reflective element can include a prism (e.g., as shown at 814).

Figure 11:
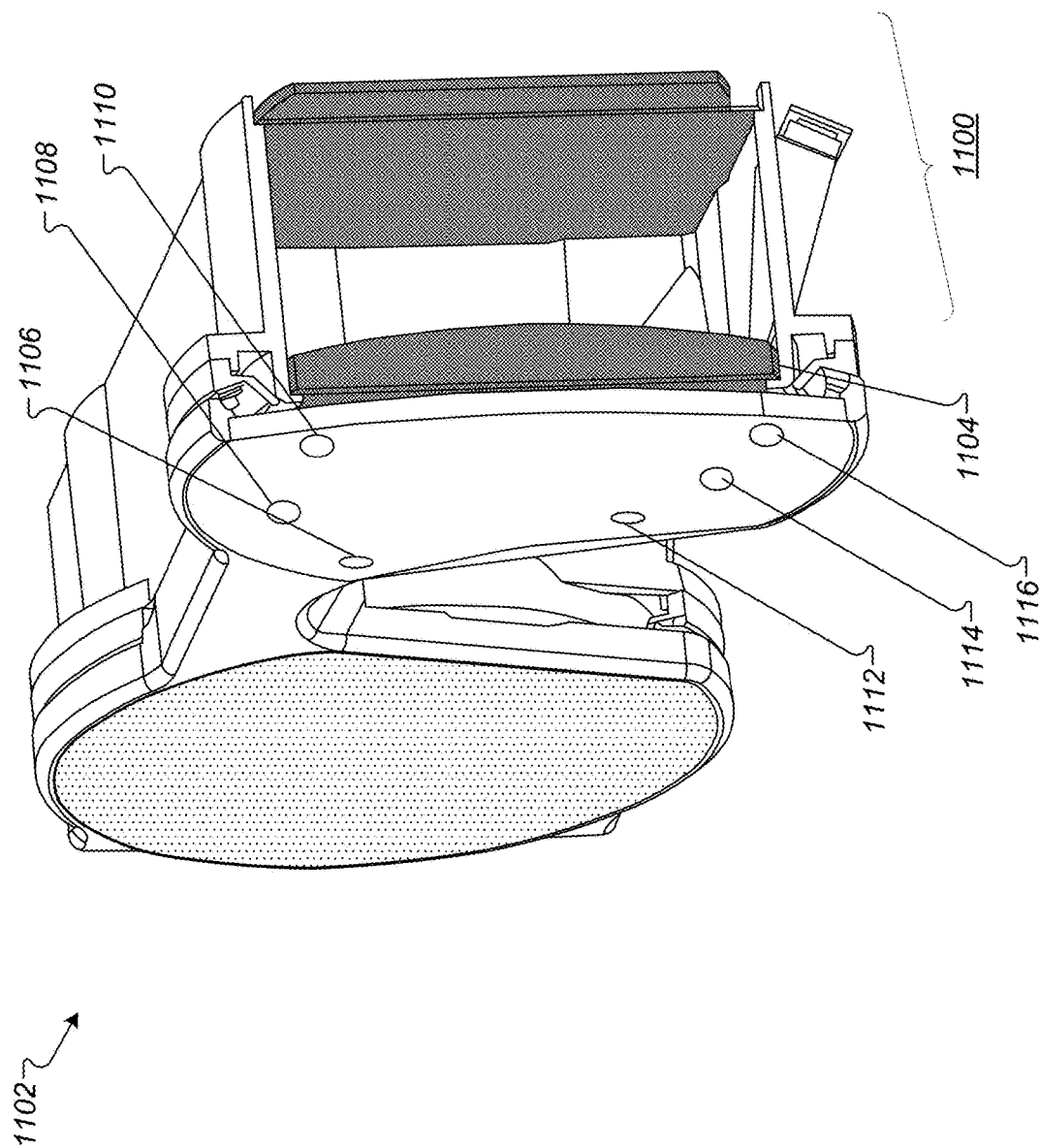
FIG. 11 is a block diagram of yet another example optical assembly.

In some implementations, one or more light emitting diodes can be placed in a perimeter surrounding the at least one lens, as shown in FIG. 11. The one or more light emitting diodes may be configured to direct light to an eye (e.g., eye 202) of a user accessing the assembly 200. The reflective element may be configured to receive a portion of the light from the eye at the reflective element and reflect a wavelength of the portion to the camera 212.

In one example, the first filter stack 206 can be adjacent to the second filter stack 208 and can be configured into a stacked arrangement between a lens 210 and a display panel 204. In some implementations, the first filter stack 206 includes a first linear polarizer 302, stacked between the display panel 204 and a first quarter wave plate 304. The first quarter wave plate may be stacked between the first linear polarizer 302 and a beam splitter 306. In the same example, the second filter stack 208 can include a polarizing beam splitter 310 stacked between a second quarter wave plate 308 stacked after the beam splitter 306. The polarizing beam splitter 310 may be stacked between the second quarter wave plate 308 and a second linear polarizer 312. The second linear polarizer 312 may be coated with the reflective element 316 that faces the lens 210.

Figure 3:
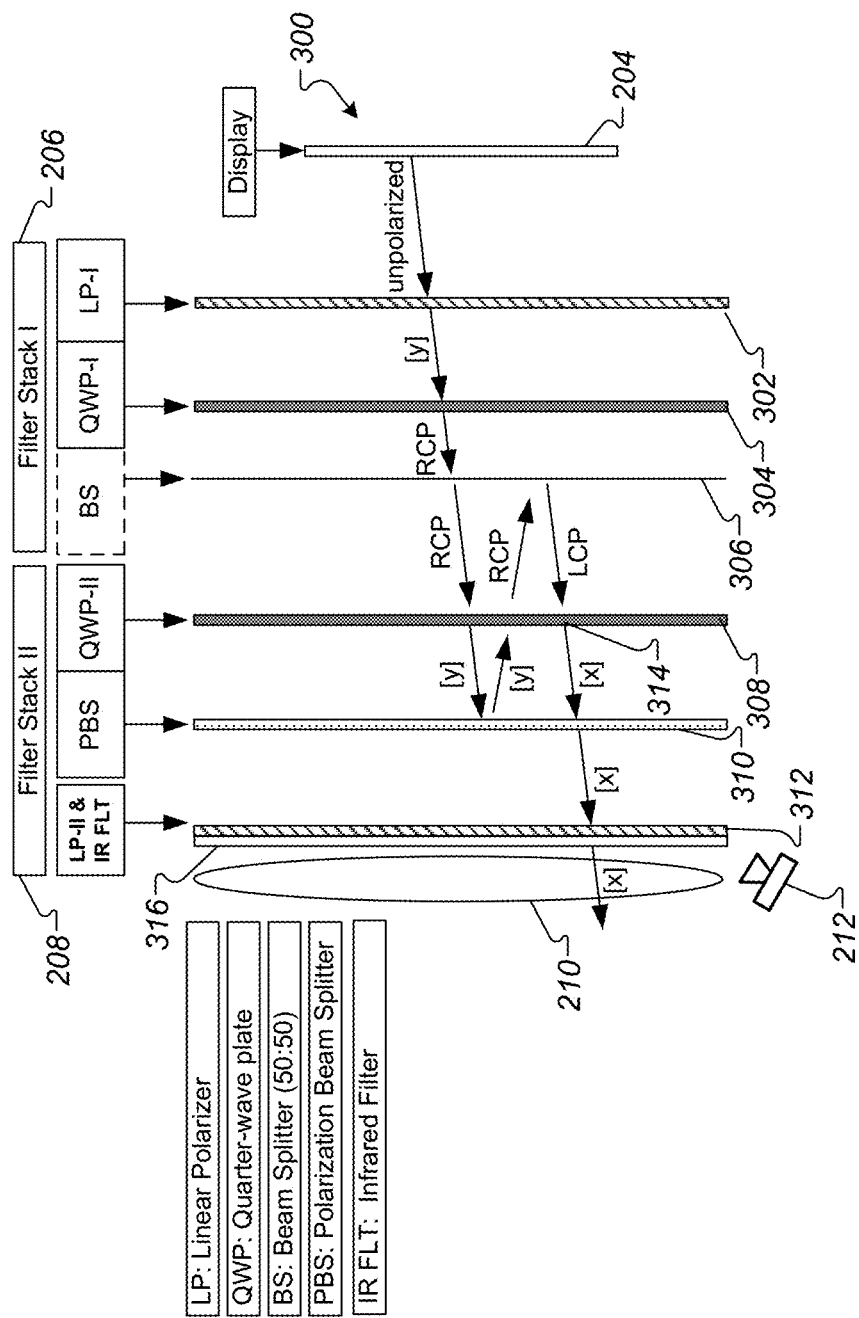
FIG. 3 is a diagram depicting an example polarization path of light travelling through the optical assembly illustrated in FIG. 2.

An example assembly of the first filter stack 206 may include a first linear polarizer and a beam splitter layer applied as a coating to a first quarter wave plate within the assembly (shown in detail with respect to FIG. 3). The first filter stack 206 may be operable to filter (e.g., selectively transmit light based on polarization) light received from the image-projecting device. In some implementations, the quarter wave plates can be designed to function well in broadband to provide a constant phase shift independent of the wavelength of light that is used. This wavelength independence may be achieved by using two different birefringent crystalline materials. The relative shifts in retardation over the wavelength range (i.e., dispersion) can be balanced between the two materials used. The second filter stack 208 may include a quarter-wave plate, a polarizing beam splitter (e.g., a polarization-sensitive beam splitter), and a linear polarizer within the assembly (shown in detail with respect to FIG. 3). The second filter stack 208 may be operable to fold an optical path using the infrared filter 316.

In some implementations, the optical assembly 200 also includes a display panel adapted to receive image content from the image-projecting device (e.g., mobile computing device 104). In some implementations, the optical assembly 200 also includes at least one processor for handling image content for display on the image-projecting device. In particular, as described above with respect to FIG. 1, image content can be provided by one or more processors, computers, or other resources, and can be displayed, stored, and/or modified using image projecting device (e.g., mobile computing device 104, etc.). In addition, one or more processors can be onboard optical assembly 200 to capture, upload, download, transmit/and or receive image content associated with (e.g., captured by) camera 212.

FIG. 3 is a diagram depicting an example polarization path 300 of light transmitted through the optical assembly 200 illustrated in FIG. 2. Here, the filter stacks 206 and 208 are shown disposed between the display panel 204 and the lens 210. A camera 212 is shown below the lens 210 to capture an image of a reflection of the user's eye (not shown at the left of the lens 210) through the lens 210.

In one non-limiting example, the first filter stack 206 is coupled to the second filter stack 208 and configured into a stacked arrangement with other components. One such example of a stacked arrangement may include a first linear polarizer 302 that is adjacent to the display panel 204 and stacked adjacent to a first quarter wave plate 304. The first quarter wave plate 304 is stacked or coated with a beam splitter layer 306, which is stacked beside a second quarter wave plate 308 on a first side of the plate 308. A second side of the second quarter wave plate 308 is stacked beside a polarizing beam splitter 310, which is stacked beside a second linear polarizer 312. The second linear polarizer 312 is adjacent to the at least one refracting lens 210.

In some implementations, the beam splitter layer 306 includes a partial-mirror coating on the first filter stack 206. The beam splitter layer 306 may be operable to split light beams/rays with a splitting ratio of about 50 percent. In some implementations, the beam splitter layer 306 may perform with a beam-splitting ratio of about 50 percent and can have a maximum transmission of about 25 percent if the display is linearly polarized or about 12.5 percent if the display is unpolarized. In some implementations, the beam splitter layer 306 is not included in the first filter stack 206 and is instead a standalone device positioned between filter stack 206 and filter stack 208.

In some implementations, the second filter stack 206 is configured without the linear polarizer 302 in the event that the image-projecting device includes a non-emissive display, such as an LCD display. The linear polarizer 302 may be excluded, for example, because an LCD display generally provides linearly polarized output. In other implementations, the linear polarizer 312 is included and coated with an IR filter 316 on a side (e.g., left hand side of LP-II in FIG. 3).

In some implementations, the linear polarizer 312 in the filter stack 208 is an optional component included so that the scattered light from a user's face (i.e., illuminated by the display light) is not reflected directly by the polarizing beam splitter 310. Such reflections may negatively affect a viewing experience and accordingly, including elements to deter this provide the user an improved viewing experience.

The components shown in FIGS. 2 and 3 may provide any number of possible polarization paths when light is introduced to one or more of the components. One example polarization path 300 may include the display panel 204 receiving emitted light (from mobile computing device 104) to be linearly polarized by linear polarizer 302. The light may become circularly polarized after passing through the quarter-wave plate 304, which may be placed at 45-degree angle. For example, the first quarter wave plate may be disposed at about 45 degrees off a vertical that corresponds with the longitudinal edge of the first filter stack 206. The light is then partially reflected by the beam splitter 306, which changes the handedness of its circular polarization. The light can be passed to the quarter-wave plate 308, which rotates the circularly polarized light back to linearly polarized.

The linearly polarized light, which is orthogonal to the passing state of the polarizing beam splitter 310, can be reflected by and become circularly polarized again after passing back through the quarter wave plate 308. After passing through the quarter wave plate 308 the third time (at point 314), the light becomes linearly polarized, which can be parallel to the passing state of the polarizing beam splitter 310. The transmitted light, after passing through another optional linear polarizer 312, can be refracted by a lens/group of lenses 210 to form a virtual image to be presented to an eyepiece of an HMD device and the eye of the user.

In some implementations, the optical element in the head-mounted display assembly can include or house an image projecting device operable to display image content to at least one eyepiece in the head-mounted display assembly. The optical assembly may include at least one lens, a first filter stack between the at least one lens and the image projecting device. The first filter stack may include at least one surface coated with a beam splitting layer. The optical assembly may also include a second filter stack between the first filter stack and the image projecting device. The second filter stack may include at least one surface coated with a reflective element that faces the at least one lens. The optical assembly may also include or be coupled to a camera placed beneath the at least one lens, the camera being configured to capture images of a reflection through the at least one lens.

By way of a non-limiting example, the filter stack 208 may be a standalone piece or may be bonded to the front refracting lens (or group of lenses). Similarly, the filter stack 206 may be a stand-alone piece or an integrated layer of the display panel 204. In some implementations, a filter stack configuration includes the axes of the linear polarizer 302 and the linear polarizer 312 being orthogonal. Similarly, the axes of the first quarter wave plate 304 and the second quarter wave plate 308 may be orthogonal. Any number of layers, polarizers, splitters, or plates can be added or removed from filter stack 206 and/or 208.

Figure 4:
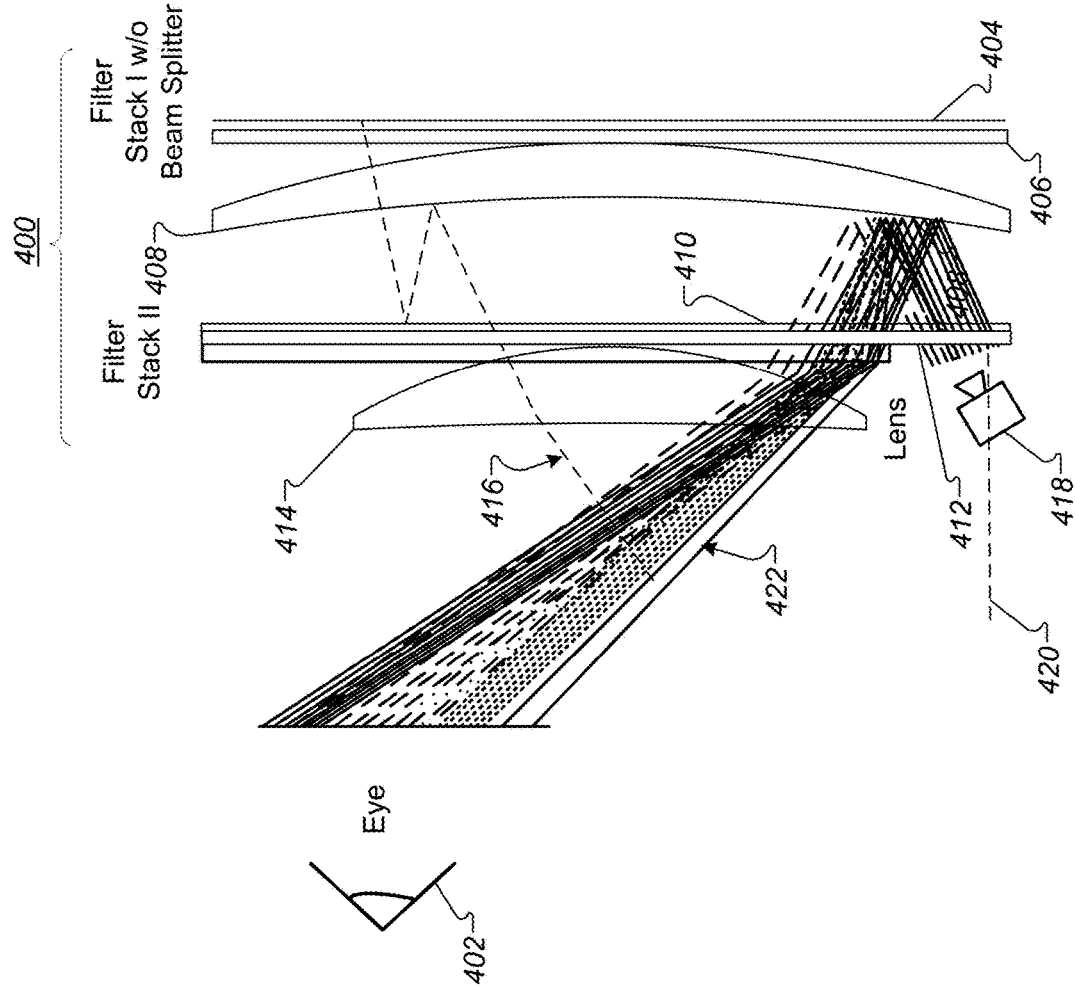
FIG. 4 is a block diagram depicting an example hybrid optical assembly.

FIG. 4 is a block diagram depicting an example hybrid optical assembly 400. The hybrid optical assembly 400 may include one or more optical elements in between two filter stacks 406 and 410. The hybrid optical assembly 400 may additionally place a beam-splitting layer on a curved surface of a lens inserted between the two filter stacks 406 and 410. One advantage to using the hybrid optical assembly 400 may include providing few optical aberrations from included optical elements and the use of positive mirror surface, which can allow a viewer to resolve smaller display pixels.

In some implementations, the display space within an HMD device housing the hybrid optical assembly 400 may provide telecentricity allowing improved focus adjustment when a display panel is shifted axially. In this configuration, the image magnification and distortion may remain constant when one or more of the display panels shift axially for focus adjustment.

Such an assembly 400 can significantly reduce the lens display space within the HMD device. For example, the lens display space can be reduced up to about 60 percent to about 70 percent of typical lens display space used by a mobile computing device-based HMD device. In one non-limiting example, the lens display space may be reduced from about 39 millimeters to about 13 millimeters. In other examples, the lens display space may be reduced from about 39 millimeters to about 13.5 millimeters. In another non-limiting example, the lens display space may be reduced from about 39 millimeters to about 12.48 millimeters. In another non-limiting example, the lens display space may be reduced from about 45 millimeters to about 15.75 millimeters. In another non-limiting example, the lens display space may be reduced from about 40 millimeters to about 16 millimeters. In another non-limiting example, the lens display space may be reduced from about 40 millimeters to about 13 millimeters.

As shown in FIG. 4, an eye 402 of a user is simulated to the left of the optical assembly 400, while a display panel 404 is shown to the right of the optical assembly 400. The optical assembly 400 includes a first filter stack 406, a curved lens 408 that includes a beam splitter layer built in (not shown), a second filter stack 410, with an IR filter coating 412, and a lens 414.

In some implementations, the lens 414 may be included in the optical assembly for each of the left and right eyepiece. The lens 414 may be disposed in the HMD device adjacent to the filter stack 410 and adapted to receive image content originating at the image projecting device/mobile computing device and through the optical assembly toward the filter stack 410.

The optical assembly 400 can function to fold the optical path of light presented by display panel 404 and through the filter stacks 406 and 410. In this example, an example folded optical path is shown by path 416. In the depicted example, the curved lens 408 may include a beam splitter coating including a positive mirror surface configured to resolve display pixels. The lens 408 may be disposed such that the concave side faces the filter stack 410 and the convex side faces filter stack 406. In some implementations, the optical assembly 400 may be telecentric when the average angle of ray bundles on the display surface is close to perpendicular.

An infrared camera 418 is shown capturing a reflection image of the eye of the user through IR filter 412. The camera 418 can be placed anywhere along line 420. The camera 418 can capture an image of the user's eye 402, as shown by example path 422.

Figure 5:
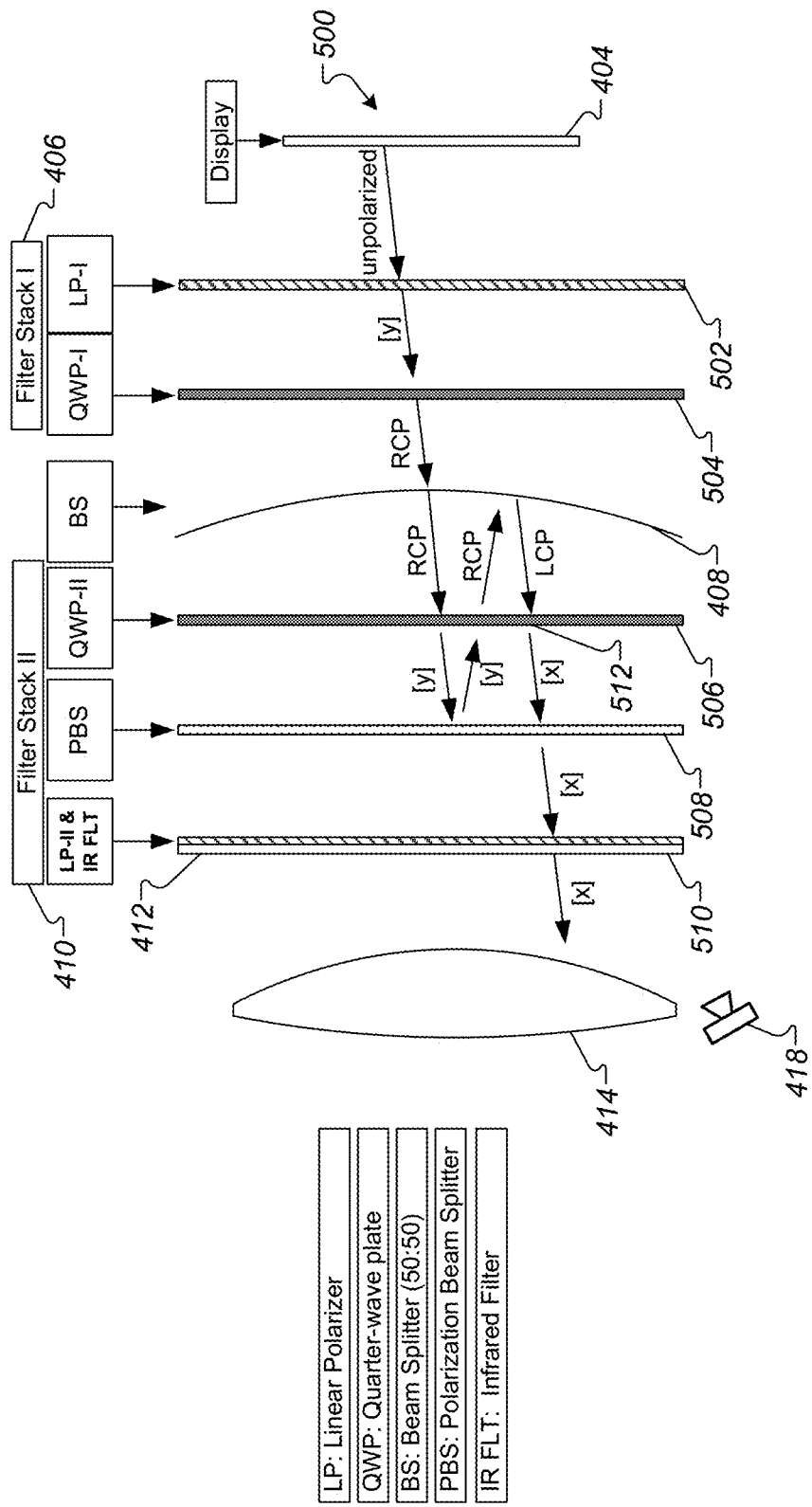
FIG. 5 is a diagram depicting an example polarization path of light travelling through the hybrid optical assembly illustrated in FIG. 4.

FIG. 5 is a diagram depicting an example polarization path 500 of light transmitted through the hybrid optical assembly 400 illustrated in FIG. 4. Here, the filter stacks 406 and 410 are disposed between the display panel 404 and lens 414.

In one example, the first filter stack includes a linear polarizer with an IR filter layer 412 facing the lens 414. The IR filter layer 412 can be utilized by the camera 418 to capture an image of a reflection of the user's eye in the user's field of view (e.g., through the lens 414, for example.

In one example, the first filter stack 406 is coupled to the second filter stack 410 and configured into a stacked arrangement with other components. One such example of a stacked arrangement may include a first linear polarizer 502 that is adjacent to the display panel 404 and next to a first quarter wave plate 504. The first quarter wave plate 504 is stacked adjacent to a curved lens 408, which is stacked adjacent to a second quarter wave plate 506. The second quarter wave plate 506 is stacked adjacent to a polarizing beam splitter 508, which is stacked adjacent to a second linear polarizer 510. The second linear polarizer 510 is adjacent to the at least one lens 414.

In general, the lenses 408 and 414 may be non-rotationally symmetrical. Non-rotationally symmetrical lenses 408 and 414 can be beneficial whenever the system is no longer rotationally symmetric. For example, the system may no longer be rotationally symmetric when the display is curved differently in two orthogonal meridians (e.g., cylinder, saddle-shape, etc.). In some implementations, using non-rotationally symmetrical lenses can provide the advantage of successfully balancing the aberrations to achieve a uniform image quality across the field of view. In some implementations, the lens 414 may be a refracting lens. In some implementations, multiple lenses or lens arrays may take the place of lens 414.

The components shown in FIGS. 4 and 5 may provide any number of possible polarization paths of light transmitted through the components. One example polarization path 500 may include the display panel 404 emitting light to be linearly polarized by linear polarizer 502. The light may become circularly polarized after passing through the quarter-wave plate 504, which may be placed at 45-degree angle. For example, the quarter wave plate 504 may be disposed at about 45 degrees off a vertical that corresponds with the longitudinal edge of the first filter stack 406. The light may be partially reflected by the curved lens 408, which can change the handedness of its circular polarization from right to left. The light can be passed to the quarter-wave plate 506, which can rotate the circularly polarized light back to linearly polarized.

The linearly polarized light, which may be orthogonal to the passing state of the polarizing beam splitter 508, may be reflected by and become circularly polarized again after passing back through quarter wave plate 506. After passing through quarter wave plate 506 the third time (at location 512), the light may become linearly polarized, which may be parallel to the passing state of the polarizing beam splitter 508. The transmitted light, after passing through another optional linear polarizer 510, may be refracted by a lens/group of lenses 412 and may form a virtual image to be presented to an eyepiece of an HMD device and the eye of the user. The camera 418 can capture an image of the eye of the user reflected from linear polarizer 510. The captured image can be used for eye tracking to provide particular content or configuration of such content to the eye of the user.

Figure 6:
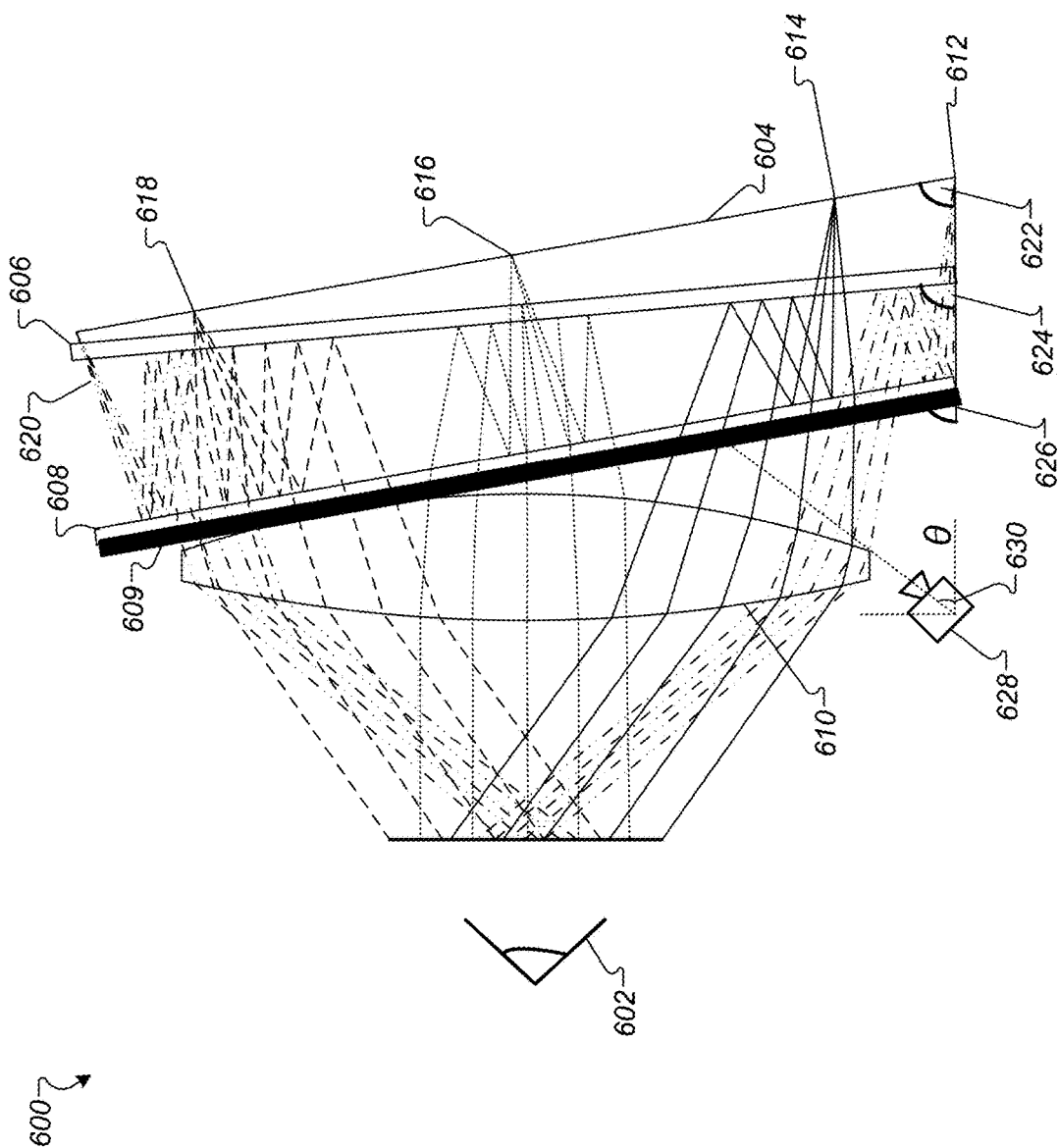
FIG. 6 is a block diagram of a variably tilted optical assembly.

FIG. 6 is a block diagram of a variably tilted optical assembly 600. The variable tilt may refer to tilting or reorienting of one or more of the filter stacks within the optical assembly 600. Alternatively, the tilting may refer to being able to tilt a display panel housed near filter stacks within the optical assembly 600. In some implementations, the tilting may be based on an angular relationship between one or more filter stacks to the display panel and/or to the lens.

As shown in FIG. 6, an eye 602 of a user is simulated to the left of the optical assembly 600 and a display panel 604 is shown to the right of the optical assembly 600. The optical assembly 600 includes the display panel 604 and a first filter stack 606 that includes a beam splitter (not shown), a second filter stack 608. The optical assembly 600 also includes a lens 610 adjacent to the filter stack 608. The optical assembly 600 can function to fold the optical path of light presented by display panel 604 and through the filter stacks 606 and 608. In this example, example folded optical paths are shown by paths 612, 614, 616, 618, and 620.

Optical assembly 600 may include components described with respect to FIGS. 2 and 3. As such, optical assembly 600 may provide examples pertaining to a tilt-able optical assembly 200. In this example, by tilting the display panel 604 at an angle 622 relative to the optical axis of lens 610, a variable space can be created between surfaces of a front polarization filter stack (e.g., filter stack 608) and a beam-splitting surface coated on filter stack 606. In operation, the display panel for each of a left and right display area can be tilted so that the corners or edges of the display panel are further outward, which may provide the advantage of significantly increasing the nose clearance, without the need to make a custom shaped HMD display. The tilting may additionally have a translational effect, which increases the center clearance between the two display panels (for each eye). In some implementations, tilting the two displays can also help make the HMD device form better to the face of a user, ultimately allowing a compact and appealing-looking industrial design.

As shown, two filter stacks 606 and/or 608 may also be adjusted (i.e., tilted) to form an angle 624 in which the display panel 604 can be moved to match such an angles. In some implementations, the filter stack 606 may be adjusted to form an angle 626 in which the display panel 604 can be moved to match such an angle.

The filter stacks 606 and 608 may be part of a near-eye display system assembly for an HMD device. For example, the stacks 606 and 608 along with lens 610 and display panel 604 can be housed in a head-mounted display device worn by a user. The filter stacks 606 and 608 may be pieces of one or more optical assemblies that can provide image content to each of a left and right eyepiece in the HMD device. The filter stack 606 may be operable to be oriented in a first direction (e.g., from zero to about 12.5 degrees toward an eyepiece in an HMD device). The filter stack 606 may include at least one surface coated with a beam-splitting layer. The beam-splitting layer may be faced away from display panel 604 and toward filter stack 608. The filter stack 608 may be operable to be oriented in a second direction (e.g., from zero to about 12.5 degrees toward an eyepiece in an HMD device).

In some implementations, the filter stack 606 may be bonded directly to the display panel 604 to provide zero degree filter angles. In some implementations, the filter stack 608 may be bonded directly to the display panel 604 to provide zero degree filter angles. As shown, the filter stack 608 includes an IR filter layer 609 similar to the IR filters described above.

In some implementations, the filter stack 606 may be adapted to be oriented in the first direction at an angle from about zero to about 12.5 degrees from the normal direction to the plane along the surface of the display panel 604. The filter stack 608 may be adapted to be tilted in the second direction at an angle from about zero to about 12.5 degrees from the normal direction to the plane of the display panel. One or both reorientations/tilts may occur in response to tilting the display panel from about zero to about 25 degrees from the normal direction to the plane of a bottom edge of the HMD device (not shown) such that the display panel is disposed perpendicular to the optical axis of the near eye display system.

The selected first and second angles may pertain to one another and may be selected based on an angle that the display panel is tilted. In one example, the display 604 is tilted and housed in the HMD device at an angle selected by a user. The display panel may be adapted to be oriented in the second direction, for example.

In general, tilting the display panel 604 may include seating the display panel 604 within and perpendicular to a base of the HMD device and angling a top edge of the display panel 604 toward the optical assembly (i.e., toward either or both of filter stack 606 and 608) corresponding to each of the left and right eyepiece. In general, the optical assembly includes at least one fixed lens for each of the left and right eyepiece. In some implementations, the least one fixed lens for each of the left and right eyepiece is disposed in the HMD device adjacent to the filter stack 608 and adapted to receive image content originating at the image projecting device and through the optical assembly toward the filter stack 608.

In some implementations, tilting the display panel 604 may result in modifying a field of view of the near-eye display system by moving image artifacts outside of the field of view. Such a modification can function to ensure that light that ghost images, created by stray light within the optical assembly, can be comfortably out of the line of sight of a user wearing the HMD device. The display panel 604 may additionally be tilted to maintain image plane focus for a user wearing the HMD device.

In some implementations, the filter stacks 406 and 410 are adapted to maintain a relationship to one another in order to maintain an optical axis perpendicular to the object plane to keep the optical system on-axis. For example, in assembly 400, the tilt angle of the display panel may be twice a relative tilt angle between the two filters. In one non-limiting example, the filter stacks 406 and 410 may be adapted to be tilted from zero to about 12.5 degrees in response to tilting the display panel 604 from about zero to about 25 degrees.

In some examples, the assembly 600 may include a camera 628. The camera 628 may be an infrared camera adapted to function with the IR coating 609. The camera 628 can capture IR images of reflections bounced off coating 609. The images may be reflections from coating 609 indicating user eye movements or position changes of the eye of a user. In some implementations, the camera 628 can also capture images of changes in facial expressions of the user.

The camera 628 can be placed from a base location of an HMD device holding the optical assembly 600 up to a bottom edge of the lens 610, for example. The camera 628 may be angled from about zero degrees to the horizontal (e.g., indicated by a bottom edge of optical assembly 600) to about 45 degrees to the horizontal, as indicated by angle 630. The angle 630 may be varied according to movement of one or both filter stacks 606 and 608. For example, if the filter stack 608 is tilted away from the eye 602 (instead of toward the eye 602, as pictured), the camera 628 can be placed at a larger angle of about 45 degrees to about 60 degrees to capture images reflecting from IR filter 609.

Figure 7:
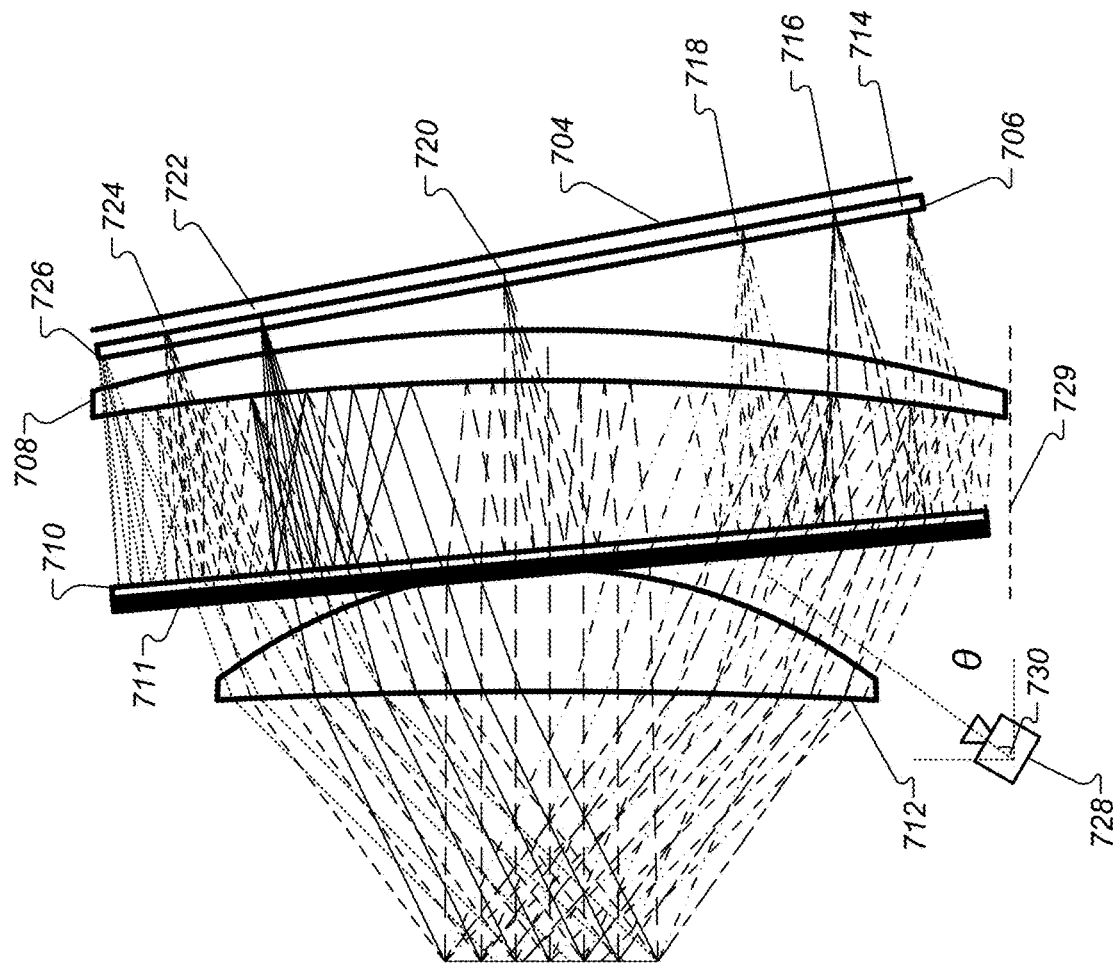
FIG. 7 is a block diagram of another variably tilted optical assembly.
Figure 7:

FIG. 7 is a block diagram of another variably tilted optical assembly 700. Optical assembly 700 may include components described with respect to FIGS. 4 and 5. As such, optical assembly 700 may provide examples pertaining to a tilt-able optical assembly 400.

As shown in FIG. 7, an eye 702 of a user is simulated to the left of the optical assembly 700, while a display 704 is shown to the right of the optical assembly 700. The optical assembly 700 includes a first filter stack 706, a curved lens 708, a second filter stack 710, and a lens 712.

The optical assembly 700 can function to fold the optical path of light presented by display 704 and through the filter stacks 706 and 710, and curved lens 708. In this example, example folded optical paths are shown by paths 714, 716, 718, 720, 722, 724, and 726. In some implementations, the optical assembly 700 may be telecentric when the average angle of ray bundles on the display surface is close to perpendicular. As shown, the filter stack 710 also includes an IR filter coating 711 similar to the IR filters described above.

The optical assembly 700 pertains to the hybrid optical assemblies described here. These assemblies may include tilted-image variants. The curved lens 708 may be composed of plastic and coated with a beam splitter layer. The optical assembly 700 may be housed in an HMD device. The HMD device may include at least one of optical assembly 700. Optical assembly 700 can, for example, include a curved beam splitter device disposed between a first filter stack and a second filter stack. The optical assembly may also include a removable image-projecting device adapted to be disposed at a number of different angles within the HMD device. In some implementations, the display panels disposed between the image-projecting device and the first filter stack may be arranged at a number of different angles within the HMD device in response to tilting the first filter stack or the second filter stack.

In some implementations, the optical assembly 700 may be configurable to balance a field of curvature in response to tilting the first filter stack or the second filter stack. In assembly 700, there may be no particular set relationship between filter stacks. The tilt relationship may depend on variables including, but not limited to the curvature of the surface with the beam splitter coating, the location of beam splitter, the location of the filter stacks, etc.

In an example, at least one display panel may be disposed at an angle selected based on an orientation associated with the first filter stack or the second filter stack. The orientation may include a tilting of more than about 5 degrees and less than about 25 degrees of a vertical offset from an optical axis of the lens. In some implementations, tilting the first filter stack or the second filter stack results in modifying a field of view associated with the head-mounted display housing, the modification including moving image artifacts outside of the field of view.

In some implementations, the HMD device may include two optical assemblies, each configured to provide image content to the lens in corresponding left and right eyepieces associated with the HMD device. For example, each optical assembly may be configured to provide image content through separate left and right eye lenses. In some implementations, the lenses are adapted to maintain image magnification and focus in response to detecting movement of at least one of the optical assemblies. For example, if one or both stacks in an optical assembly moves, the lenses associated with such stacks can accommodate the movement without loss of image magnification and focus level. In some implementations, the optical assembly 700 includes a number of optical elements disposed between the first filter stack and the second filter stack. The optical elements may be configured to decrease optical aberrations.

In some examples, the assembly 700 may include a camera 728. The camera 728 may be an infrared camera adapted to function with the IR coating 711. The camera 728 can capture IR images of reflections bounced off coating 711. The images may be reflections from coating 711 indicating user eye movements or position changes of the eye of a user. In some implementations, the camera 728 can also capture images of changes in facial expressions of the user.

The camera 728 can be placed from a base location of an HMD device holding the optical assembly 700 up to a bottom edge of the lens 712, for example. The camera 728 may be angled from about zero degrees to the horizontal (e.g., indicated by a bottom edge 729 of optical assembly 700) to about 45 degrees to the horizontal, as indicated by angle 730. The angle 730 may be varied according to movement of one or both filter stacks 706 and 710. For example, if the filter stack 710 is tilted away from the eye 702 (instead of toward the eye 702, as pictured), the camera 728 can be placed at a larger angle of about 45 degrees to about 60 degrees to capture images reflecting from IR filter 711.

Figure 8:
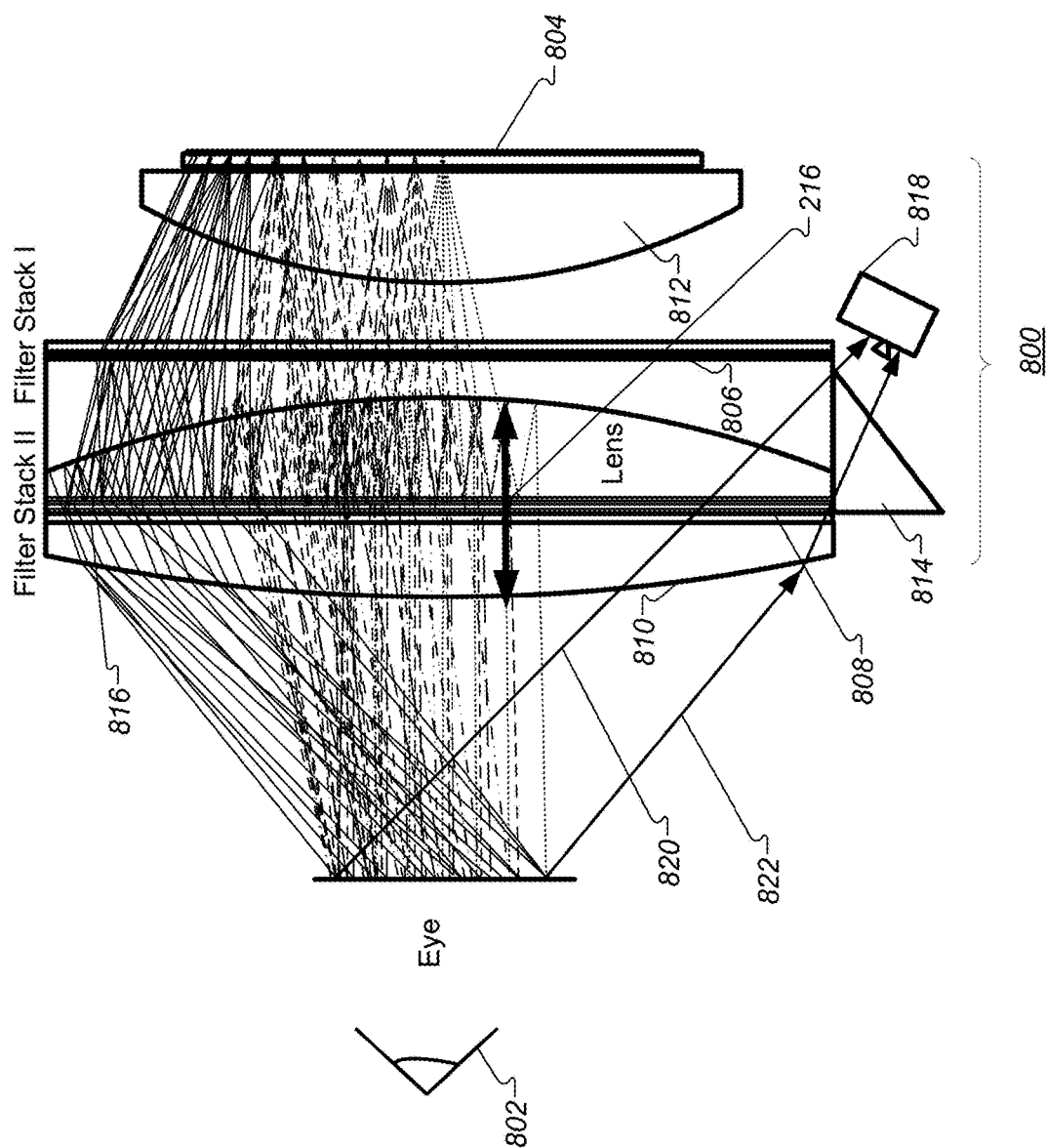
FIG. 8 is a block diagram of an example optical assembly configured to provide eye tracking functionality.

FIG. 8 is a block diagram of an example optical assembly 800. The optical assembly 800 may be installed as part of an HMD device intended for accessing virtual reality content. As shown in FIG. 8, an eye 802 of a user is simulated to the left of the optical assembly 800 and a display panel 804 is shown to the right of the optical assembly 800. In some implementations, the optical assembly 800 may be included for each of a left and right eyepiece of the HMD device. In some implementations, the optical assembly 800 may be included in a single eyepiece.

The optical assembly 800 includes (or is adjacent to) the display panel 804. As shown, the optical assembly 800 includes a first filter stack 806, a second filter stack 808, a lens 810, a lens 812, and a prism 814. The optical assembly 800 can function to fold the optical path of light presented by display panel 804 and through the filter stacks 806 and 808. In this example, the prism 814 may direct (or reflect) red light from the eye 802 through the lens and into a camera 818. The camera 818 can capture an image of the eye using such reflections of light. For example, the systems described herein can provide eye-tracking using a folded optical path with prism 818 placed between filter stack 806 and filter stack 808. As shown in FIG. 8, the prism 814 is triangular, but other shapes are possible including, but not limited to square, rectangular, spherical, etc. In some implementations, the prism 814 may be sized to fit a portion of the space between filter stack 806 and filter stack 808. For example, the prism 814 may be rigidly attached to filter stack 806 and extend from filter stack 806 into about 50 percent to about 75 percent of the space shown between filter stack 806 and filter stack 808. In some implementations, the prism 814 may be sized to connect to a bottom edge of filter 806 and a bottom edge of filter 808. For example, the prism 814 may be rigidly attached to both filter stack 806 and filter stack 808 beneath both filter stacks and beneath lens 810.

The optical assembly 800 may also include the camera 818. The camera 818 may be placed beneath optical assembly 800 such that the camera can capture an image of a user's eye using prism 814 to bounce light from the eye 802 from the lens 810 and to the camera 818. Placing the camera 818 at such a position can provide the advantage of reducing the angle at which the camera 818 is capturing an image of the eye, as compared to a camera placed to capture images by directly facing the eye of the user, if the camera were placed in the same mechanical position, but not capturing content through the lens and filter stack. The placement of camera 818 may ensure that accurate eye tracking capabilities are maintained while the HMD device can be crafted in a reduced footprint with respect to typical HMD devices.

The prism 814 may function to block and/or separate particular wavelengths in beams of a light source. For example, a beam (or many beams) of light can be provided from display 804 through optical assembly 800 toward the eye 802. The prism 814 can separate the light, for example, to provide the infrared light reflected from the eye 802. The reflection can allow the camera 818 to capture an image of the eye to track eye and/or head movements associated with the user (e.g., eye 802). The prism 814 may be constructed of any transparent material, including, but not limited to glass, acrylic, liquid filled glass or acrylic, fluorite, silica, quartz, etc.

One example of the optical assembly 800 may include the camera 818 placed below the lens 810. Although camera 818 is shown below and slightly right of lens 810, other camera locations are possible. For example, the camera 818 can be placed below lens 810 in a location in which the camera 818 can capture a reflection of an image of the eye 818 from IR filter 816 via prism 814. In an example, the camera 818 can be placed to capture a reflection and can be tilted or angled at an angle of about zero degrees to about 45 degrees depending on the placement from left to right of the lens 810.

In some implementations, the lens 810 may have a thickness 216 of about 7 millimeters to about 11 millimeters. In some implementations, the lens 810 may have a thickness 216 of about 9 millimeters to about 10 millimeters. In some implementations, the lens 810 may have a diameter of about 35 millimeters to about 45 millimeters. In some implementations, the lens 810 may have a diameter of about 40 millimeters to about 50 millimeters. In some implementations, the eye relief distance 218 may be about 15 millimeters to about 17 millimeters. In some implementations, the eye relief distance 218 may be about 13 millimeters to about 18 millimeters. In some implementations, the eye relief distance 218 may be about 12 millimeters to about 14 millimeters. In some implementations, the eye relief distance 218 may be about 17 millimeters to about 21 millimeters. In some implementations, the aspherical prescription of lens 810 may include an r1 value of about 98.1 millimeters with a k1 value of 3.69. The lens 810 may also have an r2 value of about 41.7 millimeters and a k value of about $-4.8$. The lens 810 may also have an r4 value of about $1.1 \times 10^{-5}$ and an r6 value of about $4.5 \times 10^{-9}$. Other prescriptions are possible.

In some implementations, the lenses 810 and 812 may slide in and out to focus particular content for the eye 802. For example, the lenses 810 and 812 may be adapted to slide back and forth laterally relative to a frame housing of an HMD device. The sliding can adjust the diopter for the lenses 810 and/or 812. In some implementations, sliding both lenses 810 and 812 laterally relative to the frame housing of the HMD device may correct the display of content to a user with impaired vision. The lenses 810 and/or 812 may be affixed to a movement mechanism such that both lenses rotate and/or slide together in the same plane. In some implementations, a movement of about 3 millimeters (negative or positive) may provide an adjustment of about positive 4 to about negative 6 diopter adjustment range.

In some implementations, the camera 818 and prism 814, lenses 810 and 812, and filter stacks 806 and 808 may move as a unit in which all components are rigidly affixed as shown in FIG. 8. In some implementations, rotational or slide movement can include rotation (or slide) of the entire optical assembly 800.

An example assembly of the first filter stack 806 may include a first linear polarizer and a beam splitter layer applied as a coating to a first quarter wave plate within the assembly (shown in detail with respect to FIG. 3). The first filter stack 806 may be operable to filter and split light received from the image-projecting device. In some implementations, the quarter wave plates can be designed to function well in broadband to provide a constant phase shift independent of the wavelength of light that is used. This wavelength independence may be achieved by using two different birefringent crystalline materials. The relative shifts in retardation over the wavelength range (i.e., dispersion) can be balanced between the two materials used. The second filter stack 808 may include a quarter-wave plate, a polarizing beam splitter, and a linear polarizer within the assembly (shown in detail with respect to FIG. 3). The second filter stack 808 may be operable to fold an optical path between the at least one refracting lens 810 and the image projecting device (e.g., mobile computing device 104).

In some implementations, the optical assembly 800 also includes a display panel 804 adapted to receive image content from the image projecting device (e.g., mobile computing device 104 shown in FIG. 1). In some implementations, the optical assembly 800 also includes at least one processor for handling image content for display on the image-projecting device. In particular, as described above with respect to FIG. 1, image content can be provided by one or more processors, computers, or other resources, and can be displayed, stored, and/or modified using image projecting device (e.g., mobile computing device 104, etc.). In addition, one or more processors can be onboard optical assembly 800 to capture, upload, download, transmit/and or receive image content associated with (e.g., captured by) camera 818.

In operation, display 804 may provide content to the user (e.g., shown by eye 802) in an HMD device. The HMD display device can include a ring of light emitting diodes (LEDs), for example, around each eyepiece, as shown by example in FIG. 11. The LEDs can emit light and direct the light to the eye 802. The camera 818 can capture movement of the eye 802 (e.g., capture images for eye tracking purposes). The light directed to the eye 802 can be reflected, as shown by path 820. The reflection of the light can be transmitted through lens 810, and filter stack 808 and can be captured by camera 818 as an image. As shown by path 822, the reflection can be provided through lens 810 into prism 814 and bounce off of IR filter 816 and back through prism 814 to be captured by camera 818.

In some implementations, the display is an emissive display and comprises an organic light emitting diode (OLED) display. In some implementations, the display is a non-emissive display and comprises a liquid crystal display (LCD) display.

In some implementations, the HMD devices described throughout this disclosure may be adapted to include or house an emissive display such as a Cathode Ray Tube (CRT), a Field emission display (FED), a Surface-conduction Electron-emitter Display (SED), a Vacuum Fluorescent Display (VFD), an Electroluminescent Displays (ELD), a Light-Emitting Diode Displays (LED), a Plasma Display Panel (PDP), an Electrochemical Display (ECD), a liquid crystal on silicon (LCOS), or an Organic Light Emitting Diode (OLED). In some implementations, the HMD device 102 may be adapted to include non-emissive displays including an LCD device with light sources being RGB, LED, or white LED.

In particular implementations, the systems and methods described herein can include one or more optical assemblies ranging from about 5.08 centimeters to about 7.62 centimeters both width and length and from about 2.54 centimeters to about 7.62 centimeters in depth. Other variations are possible.

Example Filter Stack Assemblies

Example filter stack assemblies are shown below. Although specific dimensions and layers are provided, other variations in such dimension are possible. In general, the filter stacks described herein are thin enough that very little image degradation occurs. In addition, magnification lenses may suffice without redesigning or readjusting based on different levels of tilting in the versions that provide tilt-able components.

A first example filter stack is shown below as Example Filter Stack I. The example filter stack includes a substrate/cover glass layer that may include an affixed beam splitter or a freestanding beam splitter. In some implementations, the beam splitter may be a coating on the quarter wave plate. The example filter stack also includes the quarter wave plate adhered with pressure-sensitive adhesive to a linear polarizer, which can be adhered to a substrate or cover glass layer. The example thickness are shown below for each component with a final first filter stack (e.g., filter stack 206) having an assembled thickness of 1.243 millimeters. In some implementations, filter stack 206 includes a substrate/cover glass (Row 1 below) with a beam splitter coating and a second substrate/cover glass (Row 7 below) with an antireflective coating.

| # | Layer | Comment | Thickness (mm) |
|---|---|---|---|
| 1 | Glass/BS | Substrate/Cover glass & Beam splitter Coating | 0.21 |
| 2 | PSA | Pressure-sensitive adhesive | 0.025 |
| 3 | QWP | Quarter waveplate film | 0.073 |
| 4 | PSA | Pressure-sensitive adhesive | 0.025 |
| 5 | LP | Linear polarizer film | 0.185 |
| 6 | PSA | Pressure-sensitive adhesive | 0.025 |
| 7 | Glass | Substrate/Cover glass & Coating | 0.7 |
| | | | =1.243 |

Example Filter Stack I

A second example filter stack is shown below as Example Filter Stack II. The example filter stack includes a substrate/cover glass layer that may include a linear polarizer film adhered with pressure-sensitive adhesive to a wiregrid polarization beam splitting film. The beam splitting film may be adhered in the same manner to a quarter-wave plate film. The quarter wave plate may be adhered to a linear polarizer, which can be adhered to a substrate or cover glass layer. The example thicknesses are shown below for each component with a final second filter stack (e.g., filter stack 208) having a thickness of 1.403 millimeters to 1.472 millimeters. In some implementations, the filter stack 208 includes substrate/cover glass layers that have an antireflective coating (i.e., in both Rows 1 and 9 below).

| # | Layer | Comment | Thickness (mm) |
|---|---|---|---|
| 1 | Glass | Substrate/Cover glass & Coating | 0.7 |
| 2 | PSA | Pressure-sensitive adhesive | 0.025 |
| 3 | LP + IR FLT | Linear polarizer film with IR filter | 0.130-0.199 |
| 4 | PSA | Pressure-sensitive adhesive | 0.025 |
| 5 | WGF | Wiregrid Polarization Beam splitting film | 0.19 |
| 6 | PSA | Pressure-sensitive adhesive | 0.025 |
| 7 | QWP | Quarter waveplate film | 0.073 |
| 8 | PSA | Pressure-sensitive adhesive | 0.025 |
| 9 | Glass | Substrate/Cover glass & Coating | 0.21 |
| | | | =1.403-1.472 |

Example Filter Stack II

A third example filter stack is shown below as Example Filter Stack III. The example filter stack may be stacked near or adjacent to a curved beam splitter and/or lens. That is, the curved beam splitter may be a free standing beam splitter. The filter stack may include a quarter wave plate film adhered to a linear polarizing film that is adhered on the opposite side to a substrate/cover glass layer. The layers may be adhered with pressure-sensitive adhesive, or by another method. The example thickness are shown below for each component with a final first filter stack (e.g., filter stack 406) having an assembled thickness of 1.848 millimeters. In some implementations, the filter stack 406 includes substrate/cover glass layers that have an antireflective coating (i.e., in both Rows 1 and 7 below).

| # | Layer | Comment | Thickness (mm) |
|---|---|---|---|
| 1 | Glass | Substrate/Cover glass & Coating | 0.5 |
| 2 | CBS | Curved Beam Splitter/Lens | 0.34 |
| 3 | QWP | Quarter waveplate film | 0.073 |
| 4 | PSA | Pressure-sensitive adhesive | 0.025 |
| 5 | LP | Linear polarizer film | 0.185 |
| 6 | PSA | Pressure-sensitive adhesive | 0.025 |
| 7 | Glass | Substrate/Cover glass | 0.7 |
| | | | =1.848 |

Example Filter Stack III

A fourth example filter stack is shown below as Example Filter Stack IV. The example filter stack includes a substrate/cover glass layer that may include a linear polarizer film adhered with pressure-sensitive adhesive to a wiregrid polarization beam splitting film. The beam splitting film may be adhered in the same manner to a quarter wave plate film. The quarter wave plate may be adhered to a linear polarizer, which can be adhered to a substrate or cover glass layer. A beam splitter (e.g., lens 408) may be inserted between Example Filter Stack III and Example Filter Stack IV. The example thicknesses are shown below for each component with a final second filter stack (e.g., filter stack 410) having a thickness of 1.403 millimeters to 1.472 millimeters. In some implementations, the filter stack 410 includes substrate/cover glass layers that have an antireflective coating (i.e., in both Rows 1 and 9 below).

| # | Layer | Comment | Thickness (mm) |
|---|---|---|---|
| 1 | Glass | Substrate/Cover glass | 0.7 |
| 2 | PSA | Pressure-sensitive adhesive | 0.025 |
| 3 | LP + IR FLT | Linear polarizer film with IR filter | 0.130-0.199 |
| 4 | PSA | Pressure-sensitive adhesive | 0.025 |
| 5 | WGF | Wiregrid Polarization Beam splitting film | 0.19 |
| 6 | PSA | Pressure-sensitive adhesive | 0.025 |
| 7 | QWP | Quarter waveplate film | 0.073 |
| 8 | PSA | Pressure-sensitive adhesive | 0.025 |
| 9 | Glass | Substrate/Cover glass | 0.21 |
| | | | =1.403-1.472 |

Example Filter Stack IV

In any of the filter stacks described herein, the polarizer layer/film (e.g., LP) may be outside of a filter stack. For example, the polarizer layer may be laminated on or within a display module. If for example, the display includes a polarizer layer (i.e., as in a pre-polarized display), the polarizer layer is not needed.

As used herein, and unless the context dictates otherwise, any discussion of tilting, orienting, or direction with respect to components described in this disclosure generally pertains to moving said component from a normal direction to the plane of a vertically placed component within an HMD device, for example. Namely, moving components described in this manner can pertain to moving the component with respect to the optical axis of particular lenses used in the assemblies.

As used herein, and unless the context dictates otherwise, the term "coupled to" is intended to include both direct coupling (in which two elements that are coupled to each other contact each other) and indirect coupling (in which at least one additional element (including airgap) is located between the two elements).

Figure 9:
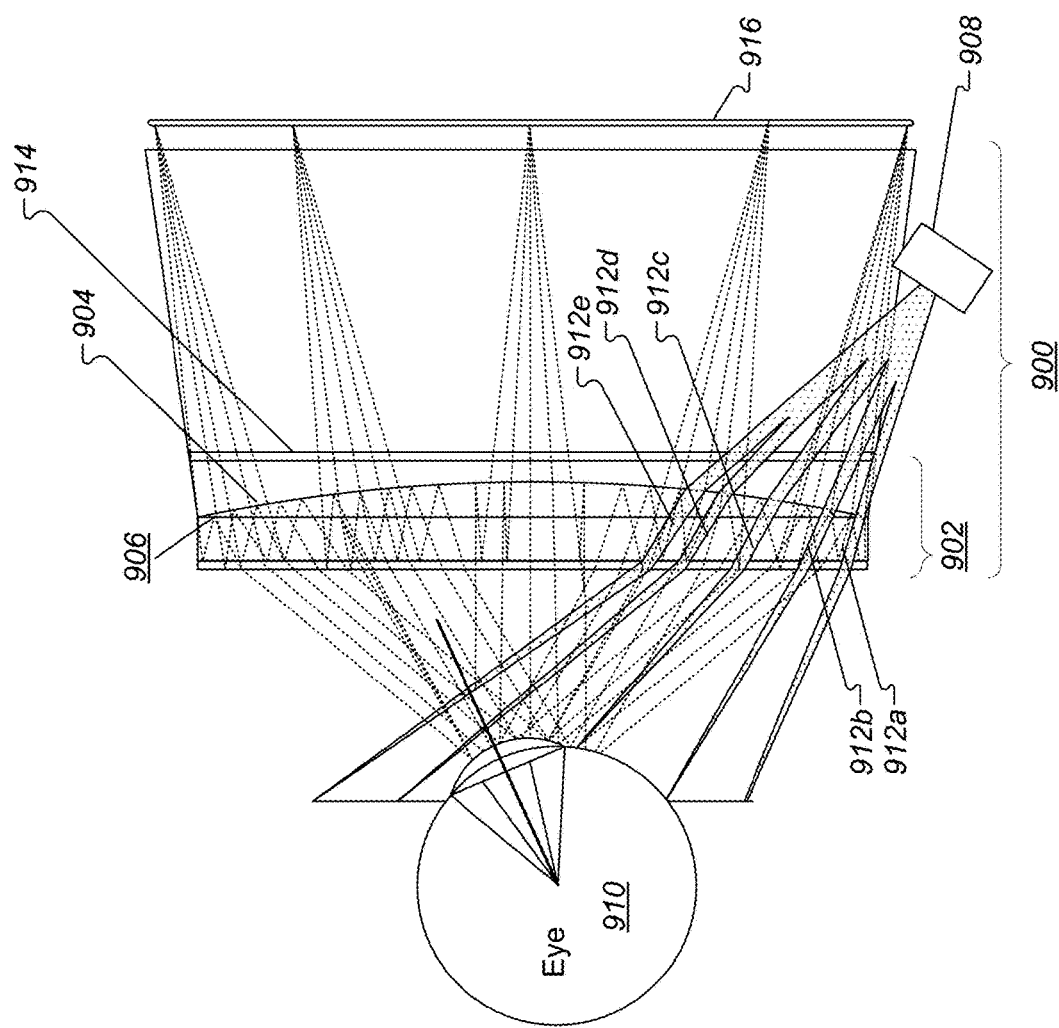
FIG. 9 is a block diagram of another example optical assembly configured to provide eye tracking functionality.

FIG. 9 is a block diagram of another example optical assembly 900. As shown, assembly 900 includes an optical configuration with a folded optical path 902. A lens 904 is placed within the optical path 902. The lens 904 uses polarization optics and at least one 50/50 transflective (e.g., partially transmissive and partially reflective) filter stack 906 to provide a compact optical configuration. An IR camera 908 can be placed to capture images of the eye 910 of a user with an optical paths 912a, 912b, 912c, 912d, and 912e, for example, though the transflective (e.g., partially transmissive and partially reflective) optics (e.g. filter stack 906, filter stack 914 and lens 904). For example, one or more filter stacks (e.g., 906 and 914) in combination with lens 904 may be transparent to enable camera 908 to perform eye tracking image capture through the optical elements including at least filter stack 906, filter stack 914, and one or more transparent lenses 904 or transparent coatings (not depicted). In some implementations, filter stack 914 may be a coating on display panel 916. In some implementations, filter stack 914 may be placed between two or more lenses within the optical path 902. In some implementations, the filter stack may be placed outside of a field of view for either or both of the eye 910 and camera field 908.

In some implementations, the display 916 may be an image projecting device operable to display image content to at least one eye-piece in a head-mounted display assembly housing assembly 900. Such an optical assembly 900 may include at least one lens 904. In some implementations, the lens 904 is fixed. In some implementations, the lens 904 is arranged to slide (e.g., be translated along its optical axis).

The first filter stack 906 may be disposed between the at least one lens and the display 916. The first filter stack 906 may have at least one surface coated with a beam splitting layer. The optical assembly 900 may also include a second filter stack 914 between the first filter stack and the display 916. The second filter stack 914 may include at least one surface coated with a reflective element that faces the at least one lens. In some implementations, the reflective element is an infrared (IR) filter coating on a side of the image projecting device facing the at least one lens. In some implementations, the reflective element is a prism, as shown in FIG. 8 at prism 814, for example.

In some implementations, the first filter stack is adjacent to the second filter stack and configured into a stacked arrangement between the at least one lens and a display panel 916. In some implementations, the second filter stack 914 can include elements similar to those in FIG. 5. For example, the first filter stack includes a first linear polarizer 502 stacked between the display panel 916 and a first quarter wave plate 504. In another example, the filter stack 914 may include the first quarter wave plate 504 stacked between the first linear polarizer and a beam splitter (e.g., such as a beam splitter 408 in FIG. 4). In some implementations, the second filter stack 914 can include a polarizing beam splitter 508 stacked between a second quarter wave plate 506 stacked after the beam splitter 408 and a polarizing beam splitter 508. In some implementations, the polarizing beam splitter 508 may be further stacked between the second quarter wave plate 506 and a second linear polarizer 510. In some implementations, the second linear polarizer 510 is coated with the reflective element 412 that faces the at least one lens 904.

The optical assembly 900 may also include a camera placed within the head mounted display assembly. The camera may be configured to capture images of an infrared reflection of light through the at least one lens. In some implementations, the camera is placed beneath the at least one lens and aimed toward the image projecting device to capture an image of an eye of a user accessing the head-mounted display assembly. In such an example, the image of the eye may be reflected from the reflective element.

In some implementations, the camera is placed beneath the at least one image projecting device and aimed toward the at least one lens to capture an image of an eye of a user accessing the head-mounted display assembly. The image of the eye may be captured through the at least one lens, through the first filter stack and through the second filter stack. This image capturing process may be iterative to gather several successive images of the eye, and as such, can be used for eye tracking purposes.

In some implementations, the lens is configured to slide laterally relative to a bottom plane of a frame housing the HMD assembly. The slide distance may be configured to trigger a diopter adjustment to correct a visual impairment associated with a user accessing the head-mounted display assembly.

In some implementations, a plurality of light sources are placed in a perimeter surrounding the at least one lens. Such light sources may be configured to direct light to an eye of a user accessing the head-mounted display assembly. In some implementations, the reflective element is configured to receive a portion of the light reflected from the eye at the reflective element and reflect an infrared wavelength of the portion to the camera. This infrared wavelength can be used to assist in eye tracking for the user of the head-mounted display assembly. In some implementations, the plurality of light sources include several light emitting diodes placed facing an eye of a user accessing the head mounted display assembly and placed in a perimeter surrounding the at least one lens.

Figure 10:
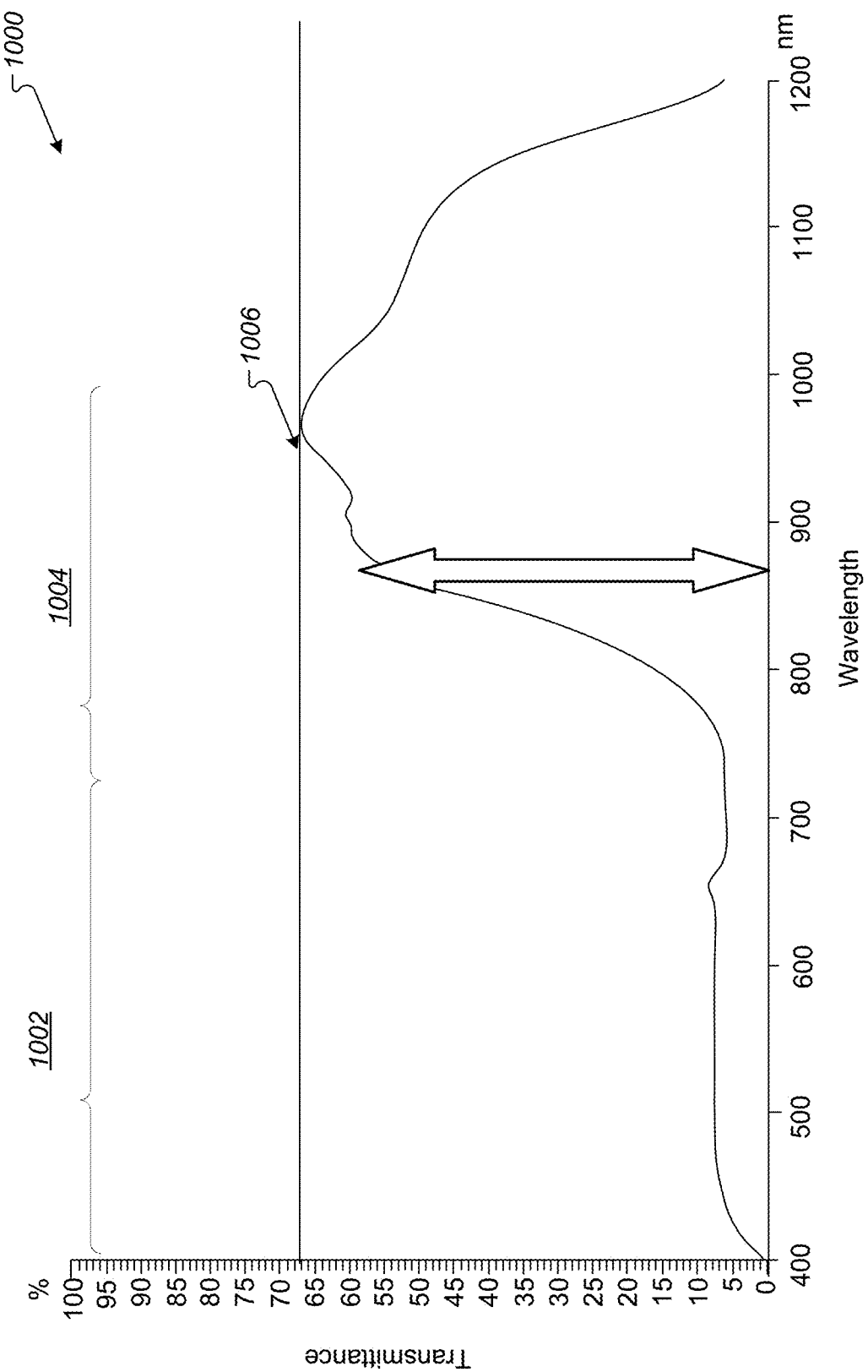
FIG. 10 is an illustration of transmission performance for an optical assembly described herein.

FIG. 10 is an illustration 1000 of transmission performance for an optical assembly having a plurality of the multi-layered polarization films described herein in combination with the 50/50 coating described throughout this disclosure. The 50/50 coating may transmit 50 percent of light and may reflect 50 percent of the light. Such an optical assembly may optimize the multiple layers in both the polarization films (both absorptive type films as well as reflective polarizer film) and the 50/50 coating to enable the polarization layers (e.g., films) to be highly transmissive to the visible light spectrum (e.g., about 400 nanometers to about 700 nanometers), as shown at 1002 and highly transmissive for the IR wavelengths 1004 (e.g., about 700 nanometers to about 1000 nanometers). As shown in FIG. 10, the transmission for the IR wavelengths 1004 is significantly higher than for a region of visible light 1002. A peak 1006 transmission of about 80 percent occurs at about 980 nanometers.

FIG. 11 is a block diagram of an example optical assembly 1100 for an HMD device 1102. As shown, the infrared LED lights are placed within the optical assembly 1100 such that light is directed through a lens 1104.

The optical assembly 1100 can provide an advantage of offering placement of a prescription corrective lens (to correct for individual prescription lens variation) within the assembly. The prescription lens (e.g., lens 1104) may be placed such that light from the LEDs are transmitted through the corrective lens 1104. In some implementations, the lens 1104 may be sized large enough to account for a ring of LEDs to direct light toward and through the lens. In some implementations, the lens 1104 may be laterally slidable relative to a frame housing of the head-mounted display assembly. Sliding the lens 1104 in such a fashion may engage (e.g., trigger) a diopter adjustment to correct a visual impairment associated with a user accessing the head-mounted display assembly.

In some implementations, one or more light emitting diodes (LEDs) are placed in a perimeter surrounding each lens/filter assembly, as shown by example LEDs 1106, 1108, 1110, 1112, 1114, and 1116. The one or more light emitting diodes may be configured to direct light to an eye of a user accessing the HMD device 1102. The reflective element may be configured to receive a portion of the light from the eye at the reflective element and reflect a wavelength of the portion to the camera. The LEDs may be symmetrically placed or asymmetrically placed around each lens/filter assembly. In operation, the LEDS may provide IR light (or near IR light) to the eye of a user, which can be bounced from the front surface of the eye. The cameras described herein can detect (e.g., capture) the bounced IR light (or near IR light) to track a direction and/or angle in which the user is looking. This can ensure that after a single bounce, the IR light is directed through the 50/50 polarizer/lens/filter stack combination.

Figure 12:
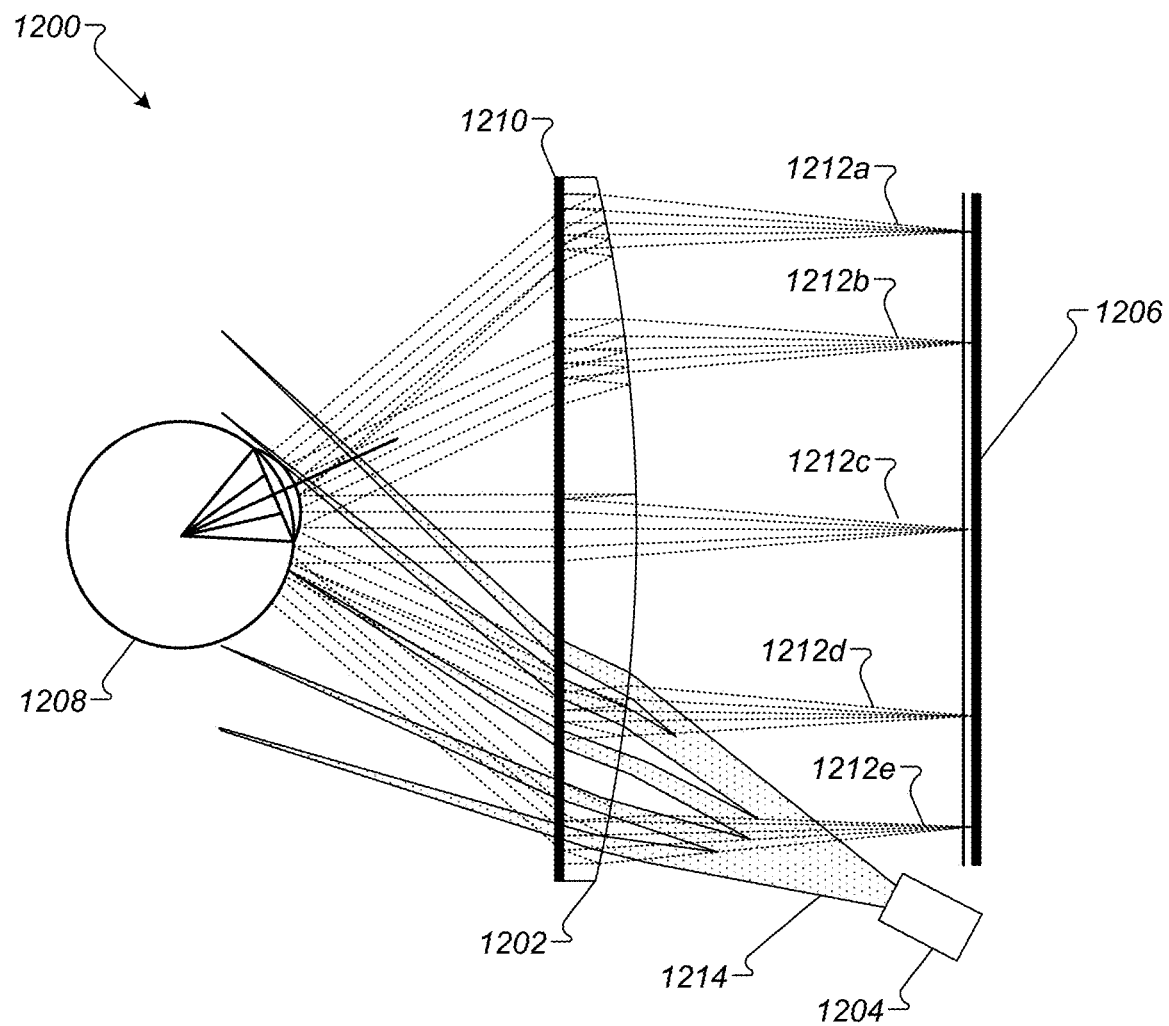
FIG. 12 is a block diagram of an example optical assembly housing at least one partially transmissive lens and a camera.

FIG. 12 is a block diagram of an example optical assembly 1200 with at least one partially transmissive lens 1202 and a camera 1204. The assembly 1200 may also include an LCD panel 1206 capable of providing image content to an eye of user, (e.g., simulated eye 1208).

The camera 1204 shown in FIG. 12 is placed slightly below the display panel 1206 and is positioned out of a visible optical path for the user. However, placing the camera in such a position outside of the field of view provides an advantage of being able to capture user eye movement while the user views the image content without having the user being able to view the camera 1204.

The optical assembly 1200 may also include one or more filter stacks 1210 that may be coatings placed upon the partially transmissive lens 1202. Filter stack 1210 and lens 1202 assembled together may have a plano-convex shape. The filter stacks in FIG. 12 may include any of the filter stacks and/or coatings described herein. In some implementations, the filter stack 1210 includes a number of coatings to represent a first lens element (e.g., such as element 414 in FIG. 4), a second lens element (e.g., such as element 408 in FIG. 4). Such coatings can function to replace full sized lenses shown as elements 414 and 408. In some implementations, the filter stack 1210 incorporates an IR filter, a first lens, and a second lens, all coated upon the stack 1210. This provides an advantage of being able to shrink the HMD device that the assembly 1200 may be installed within.

In operation, the optical assembly 1200 can be used to detect and track eye movements of a user accessing an HMD device housing assembly 1200. Such an optical assembly 1200 may optimize the multiple layers of the polarization films (both absorptive type films as well as reflective polarizer film) and the 50/50 coating to be reflective for visible light shown by light paths 1212a, 1212b, 1212c, 1212d, and 1212e (e.g., about 400 nanometers to about 700 nanometers) and highly transmissive for the IR wavelengths shown by light paths 1214 (e.g., about 850 nanometers to about 900 nanometers). In particular, the coating may allow for half of the light to pass through the combined transflective lens/filter stack 1202 and 1210 and half of the light to be reflected from the lens. In general, the visible light paths 1212a-1212e have wavelengths, optical paths, and efficiencies that are different than the IR light paths 1214.

Using IR wavelengths and light paths may enable the optical assembly 1200 to provide an advantage of a nearly straight pass through light beam in which the lens need not be as strong as with visible wavelengths and light paths. This is because visible wavelengths utilize folded optics that bounce light back and forth between elements in a particular optical assembly to properly reach the eye of a user. With IR wavelengths, the light path may go straight through the lens to reach the eye.

In some implementations, the panel 1206 may be made of about 12.8 grams of glass material. In some implementations, the panel 1206 may be made of about 6 grams of plastic material. In some implementations, the panel 1206 may include an LCD or OLED panel of about 5.0 centimeters square.

Figure 13:
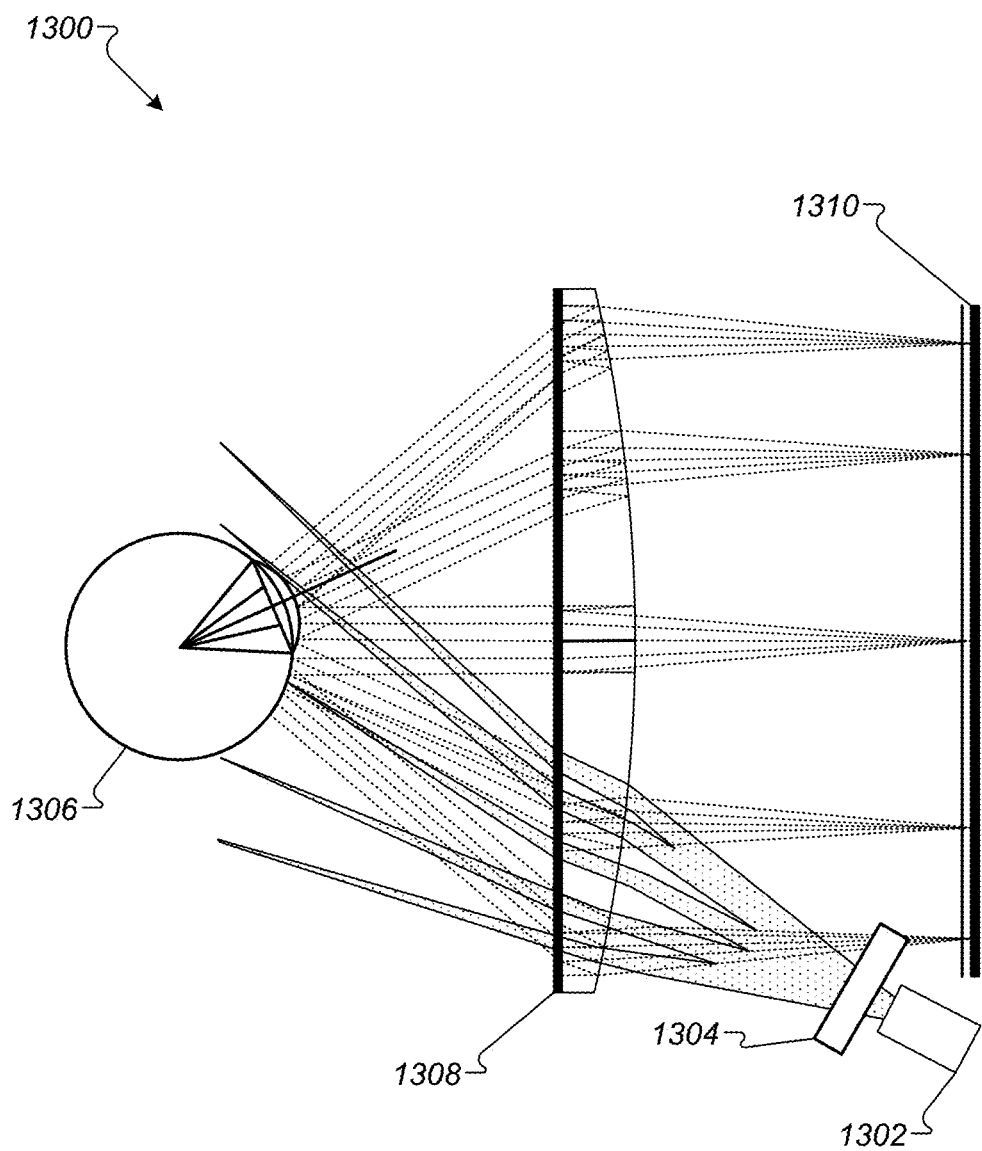
FIG. 13 is a block diagram of an example optical assembly housing a camera and at least one polarization filter in front of the camera.

FIG. 13 is a block diagram of an example optical assembly 1300 housing a camera 1302 and at least one polarization filter 1304 in front of the camera. The at least one polarization filter 1304 may be adapted to circularly polarize light for the eye-tracking camera 1302 to improve IR image contrast, which enables an improved image capture and resolution of a user's captured eye image. In addition, the at least one polarization filter 1304 may improve IR ghost imagery/path captured by the camera 1302.

In some implementations, light from panel 1310 (or light sources placed within or near assembly 1308) may be shined onto a user's eye 1306. The camera 1302 can capture a bounce of the light through lens assembly 1308, for example, and using filter 1304 to capture an image of the eye 1306 of a user accessing the HMD device, for example. In this example, the lens assembly 1308 includes at least a first lens, a shell lens, and at least one polarizer filter stack.

Figure 14:
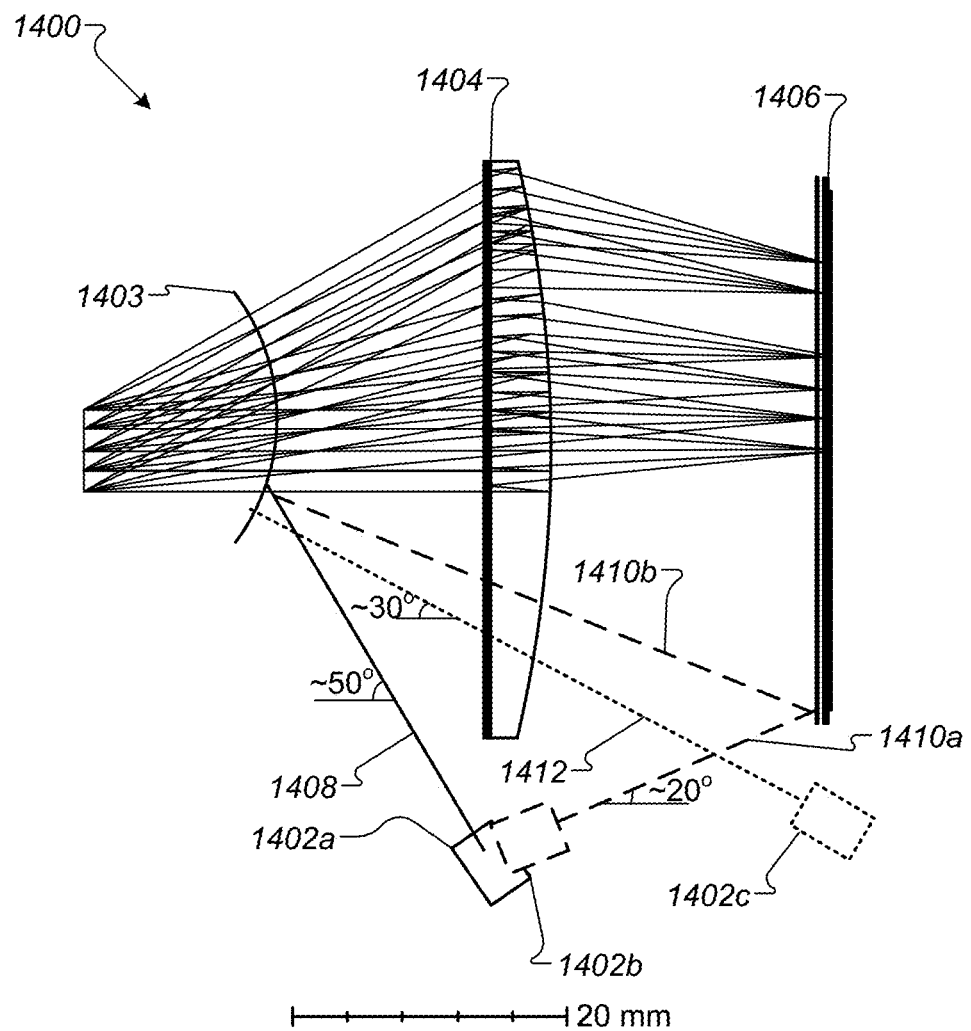
FIG. 14 is a block diagram of an example optical assembly depicting optional camera placement locations.

FIG. 14 is a block diagram of an example optical assembly 1400 depicting optional camera placement locations. In the depicted example, a transflective (e.g., partially transmissive and partially reflective) lens assembly 1404 is shown in addition to a display panel 1406. Similar to the other figures described herein, light may be passed from display panel 1406 through assembly 1404 and to an eye of a user.

In addition, three cameras are shown at alternative angels of incidence for capturing eye images to enable eye tracking. A first example camera 1402a is shown at a fifty degree angle of incidence to the surface of an eye 1403 of a user accessing an HMD device housing assembly 1400. A second example camera 1402b is shown at a twenty degree angle of incidence to the surface of an eye of a user accessing an HMD device housing assembly 1400. A third example camera 1402c is shown at a thirty degree angle of incidence to the surface of an eye of a user accessing an HMD device housing assembly 1400. Typically, a single camera is utilized within assembly 1400. The three cameras 1402a, 1402b, and 1402c are shown as example placements for an IR camera within assembly 1400.

In the example that utilizes camera 1402a, the camera 1402a is placed below the assembly 1404 and captures the eye 1403 as shown by example ray 1408. In this example, a direct line of sight to the eye is captured and no lensing is obscuring the view.

In the example that utilizes camera 1402b, the camera 1402b is placed between the assembly 1404 and the panel 1406 and angled to capture a reflection from panel 1406, as shown by example rays 1410a and 1410b. In such an example, an IR reflecting film or a coating may be placed on the panel 1406 to reflect only IR light from the eye 1403 through the assembly 1404 and to the camera 1402b.

In the example that utilizes camera 1402c, the camera 1402c is placed under panel 1406. Here, the camera 1402c can capture reflected light from the eye 1403 through the assembly 1404, as shown by example ray 1412.

Figure 15:
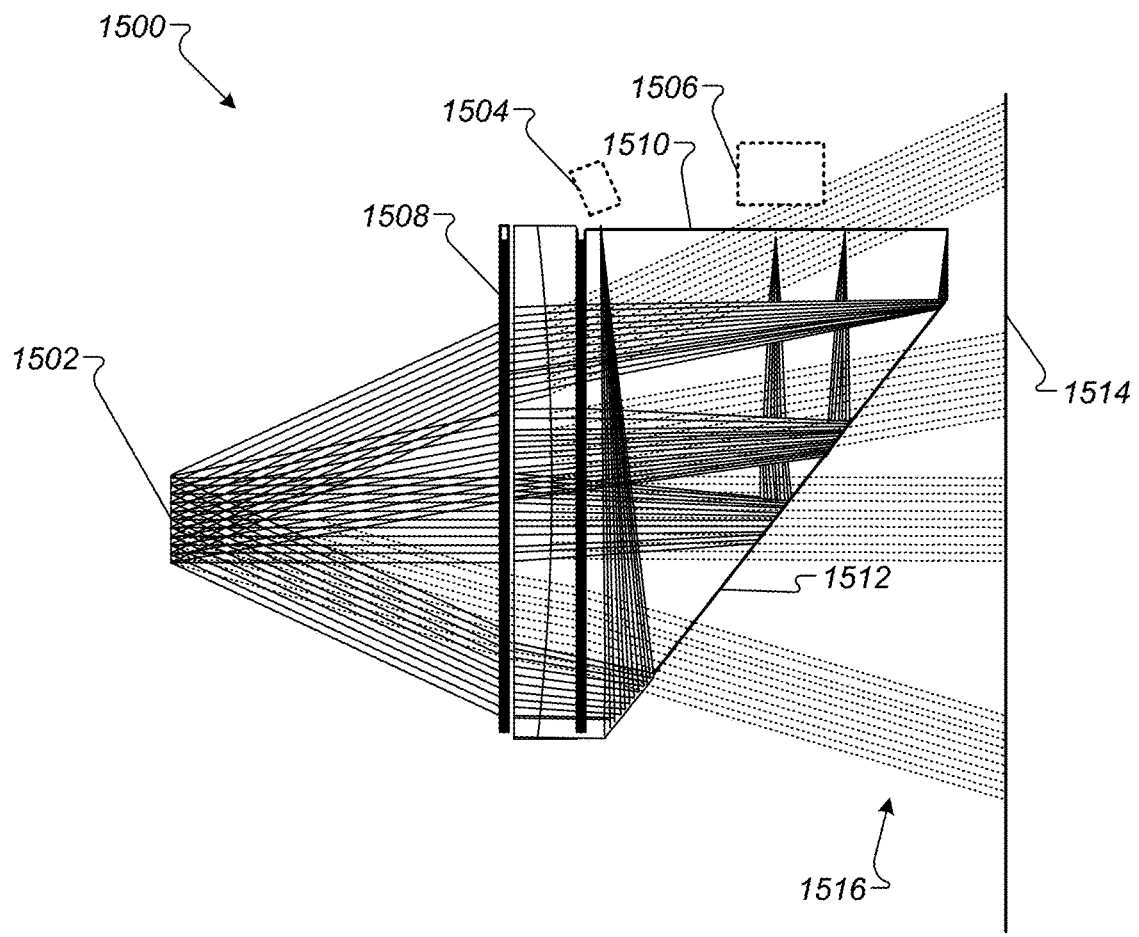
FIG. 15 is a block diagram of an example optical assembly for use in an augmented reality environment.

FIG. 15 is a block diagram of an example optical assembly 1500 for use in an augmented reality environment. In this example, cameras (e.g., camera 1504 or 1506) may be placed in a top portion of the assembly 1500 above a combined lens/filter stack assembly 1508. A display panel 1510 is provided next to cameras 1504 or 1506. The optical elements depicted in the line of sight of an eye 1502 of a user are transparent so that the physical environment surrounding the HMD device can be viewed by the user.

In order to allow viewing of both the display and the physical world, the assembly 1500 includes a beam splitter 1512. The beam splitter 1512 transmits light at a first polarization direction while reflecting light at another polarization direction. In this example, the beam splitter 1512 enables viewing outside light (e.g., light from the physical world) while also providing a view of the display panel 1510.

In this example, a user of the HMD device housing assembly 1500 may view both the physical world content as well as the display panel 1510 depicting content. The beam splitter 1512 allows reflected light to be used to view both options. In operation, eye tracking using camera 1504 or camera 1506 may be performed by receiving IR light reflected from an eye 1502 through the optics of assembly 1508 and reflecting off of the polarizing beam splitter 1512 and to the camera 1504 or camera 1506.

In some implementations, the camera may be capturing IR light from about −45 degrees to about 45 degrees relative to the normal to the plane of the eye. In this example, a 45 degree IR fold mirror is not needed in the optical path. Eye tracking can still be accomplished using either camera 1504 or camera 1506.

The assembly 1500 also includes a reflecting visor 1514. The reflecting visor 1514 may be used to reflect visible light (as shown by light paths 1516) to lighten or darken ambient light in a surrounding physical environment, for example.

Figure 16:
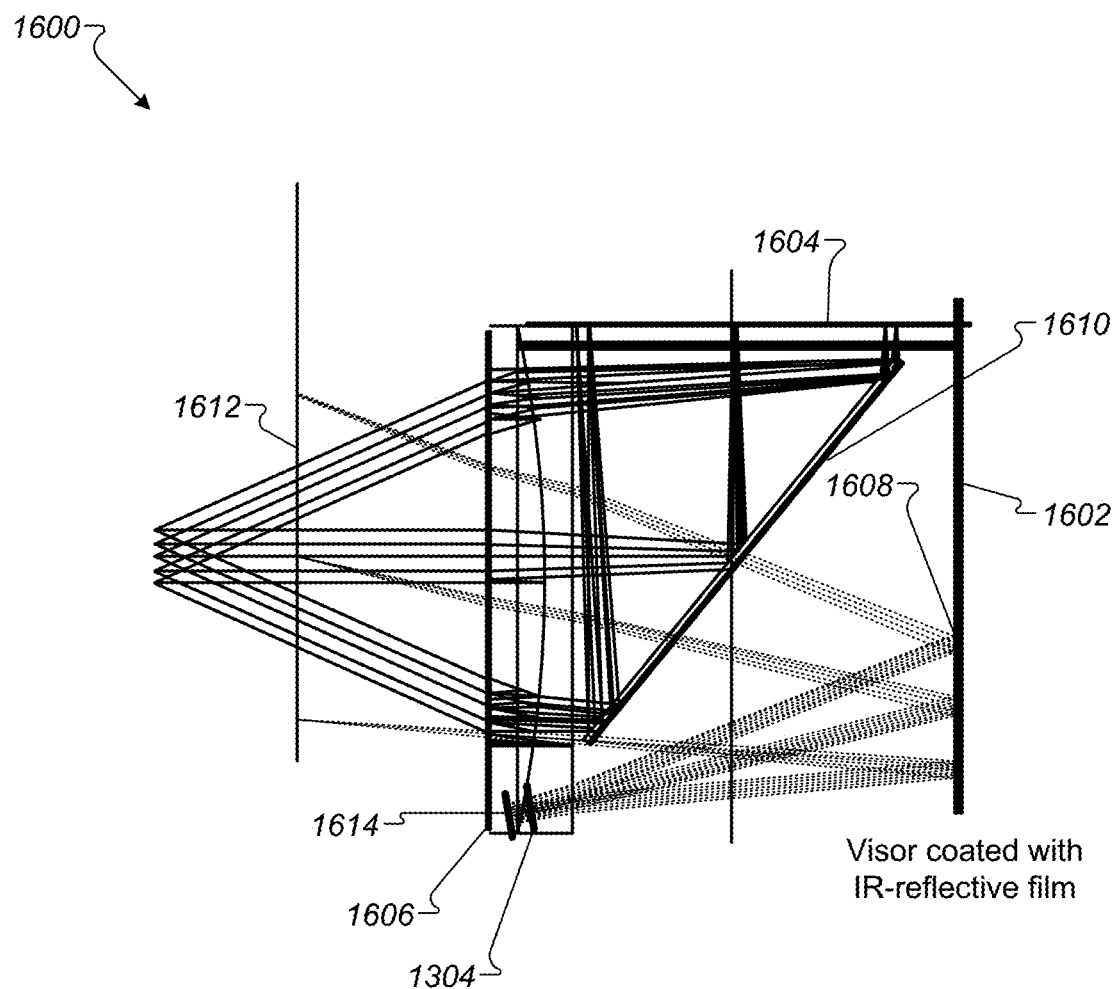
FIG. 16 is a block diagram of an example optical assembly including a reflecting visor for use in an augmented reality environment.

FIG. 16 is a block diagram of an example optical assembly 1600 that utilizes a reflecting visor 1602 for use in an augmented reality environment. In this example, a display panel 1604 is shown perpendicular to a lens/filter stack assembly 1606. The lens/filter stack assembly 1606 may include at least one filter stack, at least one lens, and a beam-splitting layer. In some implementations, the at least one lens may be part of the filter stack. In some implementations, the at least one lens may be inserted between two filter stacks.

In some implementations, the assembly 1606 may be included in the optical assembly for each of the left and right eyepiece. The assembly 1606 may be disposed in the HMD device perpendicular to the reflecting visor 1602. The reflecting visor 1602 may be used to reflect IR light (as shown by IR light paths 1608) from a beam splitter 1610 that originated from a reflection from an eye 1612 of a user through the assembly 1606. The reflected light can be captured and imaged by an IR camera 1614 to assist in eye tracking. In this example, the IR camera 1614 is shown capturing a reflection image of the eye 1612 of the user through assembly 1606 (one or more lenses and one or more filter stacks).

The camera 1606 is mounted under the eye 1612 and under the active area of the lens/filter assembly 1606. In some implementations, the eye-view angle may be about −11 degrees while the camera field of view is about 25 degrees.

In some implementations, the optical assembly 1600 includes the filter stack assembly 1614 configured to fold an optical path of light transmitted therethrough. The filter stack assembly 1606 may include at least one transflective (e.g., partially transmissive and partially reflective) lens. The lens may be placed within filter stack assembly 1606 or coated upon assembly 1606. The first filter may include at least one infrared filter layer coupled to a first side of a polarizing beam splitter layer. The polarizing beam splitter layer may be coupled, on a second side of the polarizing beam splitter layer, to a first quarter wave plate layer, as shown in FIG. 5.

The optical assembly 1600 may also include a second filter including a second quarter wave plate coupled to a linear polarizer. The second filter may be curved on a first side to be coupled to a curved lens and on a second side to be coupled to the linear polarizer. A first side of the at least one infrared filter layer is coated with the at least one lens.

The optical assembly 1600 may also include a display assembly with a first edge coupled to a top edge of the filter stack assembly and a second edge of the display assembly coupled to the top edge of a visor 1602 having an infrared coating. The visor 1602 may be disposed parallel to the filter stack assembly and perpendicular to the display assembly.

Assembly 1600 may also include a camera 1614 configured to capture images of a reflection received through the filter stack assembly and reflected from the visor 1602. The camera 1614 may be positioned beneath the filter stack assembly aimed to capture the images.

The optical assembly 1600 may also include at least one circular polarization filter 1304 placed in a line of sight from the camera to the filter stack assembly. The at least one circular polarization filter 1304 may be configured to improve infrared image contrast and minimize infrared ghost imagery.

In some implementations, the optical assembly 1600 is configured to be mounted in a frame of a head mounted display device for use in either or both virtual reality environments and augmented reality environments.

In some implementations, the filter stack assembly 1600 is transparent to provide for augmented reality experiences. In this example, the camera 1614 is configured to capture images of an eye of a user accessing a head-mounted display housing the optical assembly. The captured images may be provided to at least one processor communicably coupled to the optical assembly to perform eye tracking through the filter stack assembly.

Figure 17A:
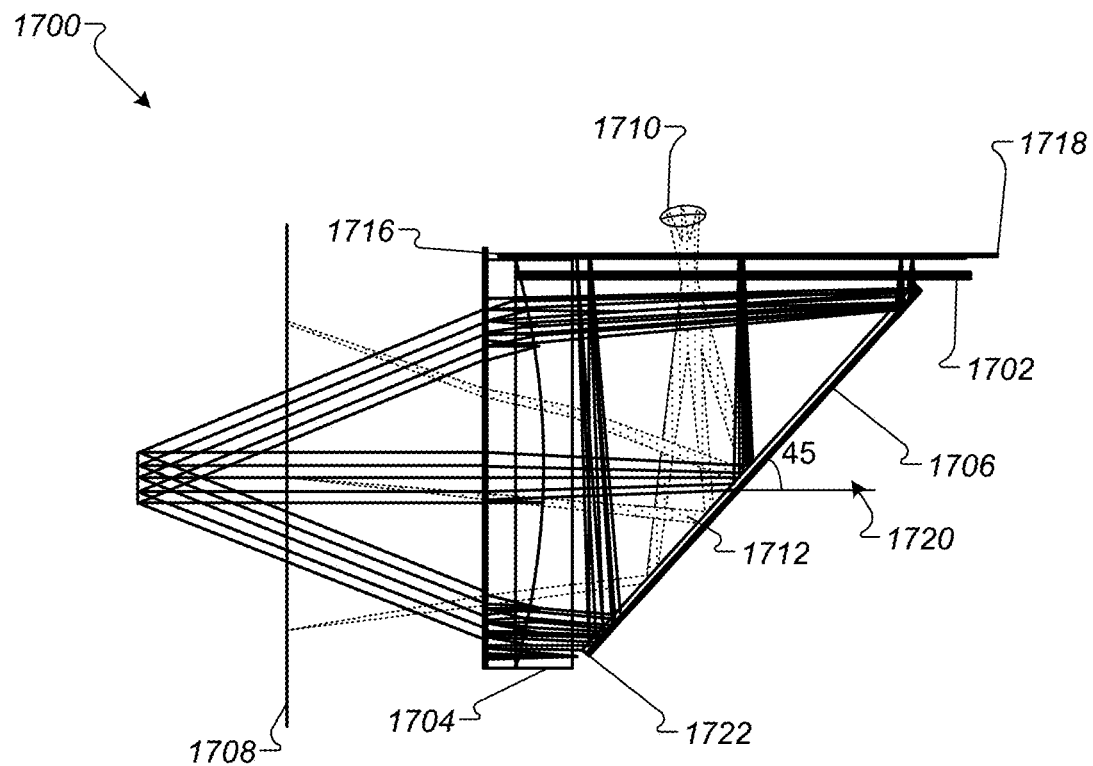
FIGS. 17A-17B are block diagrams of example optical assemblies configured with a camera housed on a side of a display.
Figure 17B:
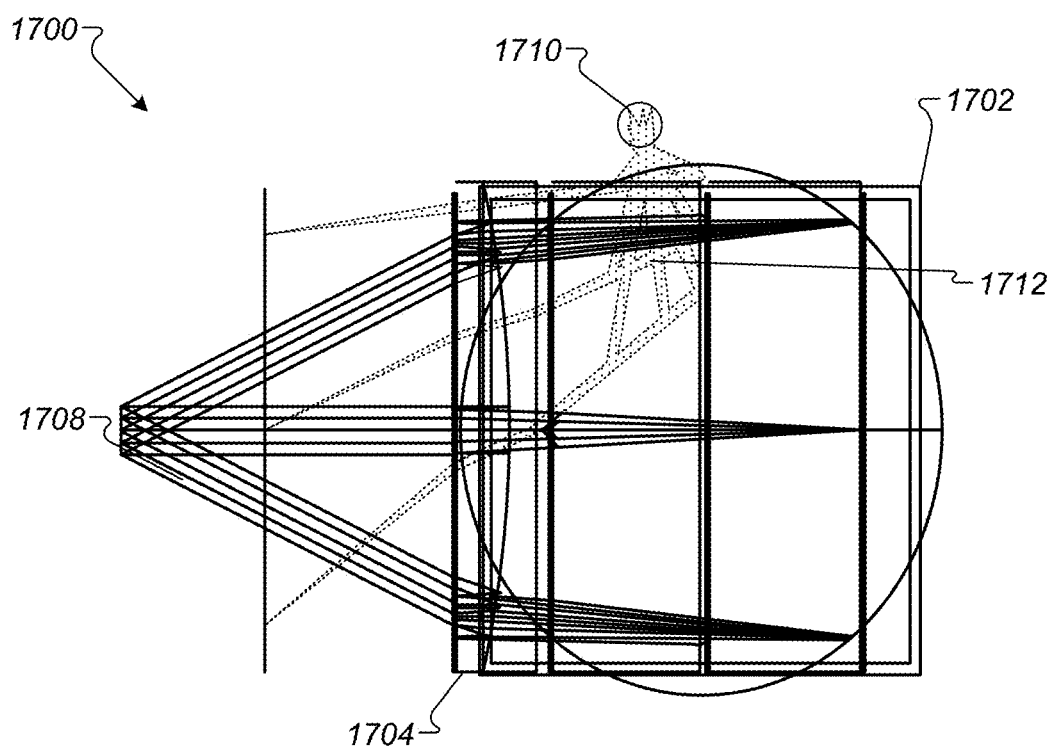

FIGS. 17A-17B are block diagrams of example optical assemblies configured with a camera housed on a side of a display. In the example configurations, a user may view both virtual content on a display and the physical space surrounding an HMD device housing the optical assembly 1700. FIG. 17A is an example optical assembly 1700 for use in augmented reality and virtual reality environments. The assembly 1700 includes a display 1702 mounted perpendicular to a combined filter stack/lens assembly 1704. The assembly 1704 may include optical elements, as defined and described in FIGS. 2-16 above.

In some implementations, the assembly 1700 may include a polarizing beam splitter 1706 coated with an IR-reflective coating. The beam splitter 1706 may bounce (e.g., reflect) light captured from an eye of a user, as shown in eye area 1708 to an IR camera 1710 beyond display 1702, as shown by example light path 1712. Here, a light source may be placed on or near assembly 1704 to shine on the eye area 1708. A reflection of the light on an eye of the user may be reflected (e.g., path 1712) toward beam splitter 1706, through display 1702 and into camera 1710. The captured reflection and any additional captured reflections can be used to implement eye tracking for an HMD device housing assembly 1700. The beam splitter 1706 may be designed to reflect IR wavelengths (or near IR wavelengths) through the display 1702 to the camera 1710.

In one example of assembly 1700, an eye-view angle may be about −5 degrees in the y-axis direction and about 24 degrees in the x-axis direction. A camera filed of view associated with camera 1710 may be about 40 degrees. These metrics may amount to an equivalent camera position (x, y, z) of about (25 degrees, −5 degrees, 57 degrees.

In some implementations, the assembly 1700 is housed in a head-mounted display system. The head-mounted display system may include at a processor, a filter stack assembly 1704, a display device 1702, and a camera 1710. The filter stack assembly 1704 may be configured to fold an optical path of light transmitted therethrough. In some implementations, the filter stack assembly includes at least one lens, a first filter, and a second filter, as shown in FIG. 5.

The first filter may include at least one infrared filter layer coupled to a first side of a polarizing beam splitter layer. The polarizing beam splitter layer may be coupled, on a second side of the polarizing beam splitter layer, to a first quarter wave plate layer.

The second filter may include a second quarter wave plate coupled to a linear polarizer. The second filter may be curved on a first side to be coupled to a curved lens, and on a second side to be coupled to the linear polarizer. In some implementations, a first side of the at least one infrared filter layer is coated with the at least one lens.

The display device 1702 is mounted in assembly 1700 with a first edge 1716 of the display device coupled to a top edge of the filter stack assembly 1704 and perpendicular to the filter stack assembly 1704 and a second edge 1718 of the display device is coupled to a first edge of an angled beam splitter filter 1706, the first edge of the beam splitter filter being tilted at an angle 1720 to the filter stack assembly. The second edge 1722 of the beam splitter filter being coupled to a bottom edge of the filter stack assembly 1704. For example, the beam splitter filter 1706 may be tilted at an angle of about 45 degrees to the optical axis of the at least one transflective (e.g., partially transmissive and partially reflective) lens in assembly 1704.

The camera 1710 may be disposed in the head-mounted display system above the display device 1702. In some implementations, the camera 1710 is configured to capture images of a reflection received through the filter stack assembly 1704 from the beam splitter filter 1706 and through the display device 1702. In some implementations, the camera provides images to the at least one processor for performing tracking of eye movements of a user accessing the head-mounted display system. In some implementations, the camera 1710 is an infrared camera capturing a field of view of about 40 degrees to about 45 degrees.

FIG. 17B is a top down view of the optical assembly 1700 of FIG. 17A. In this example, the display 1702 spans a top portion of an HMD device. A first edge is adapted to be connected or adjacent to the assembly 1704. The display 1702 may be viewed at the same time as the physical world is viewed to enable augmented reality interaction for a user.

In some implementations, the eye area 1708 is about 32 millimeters by 24 millimeters. The eye relief from the assembly 1704 may be about 17 millimeters. The eye imaging area may include a rotation of plus or minus 25 degrees in the x-direction and plus or minus about 20 degrees in the y-direction. The eye image area may be decentered at about plus or minus 5 millimeters in the x-direction and about plus or minus 2.5 millimeters in the y-direction.

FIGS. 18A-18D are illustrations of example transmission performance for the optical assemblies described herein. In the examples of FIGS. 18A-18D, a coating on a transflective (e.g., partially transmissive and partially reflective) lens (e.g., lens 1202) is tested at varying angles of incidence of light. In some implementations, this coating is 50 percent transmissive and 50 percent reflective in the visible range of about 400 nanometers to about 700 nanometers and highly transmissive in the near IR range of about 780 nanometers to about 2500 nanometers.

Figure 18A:
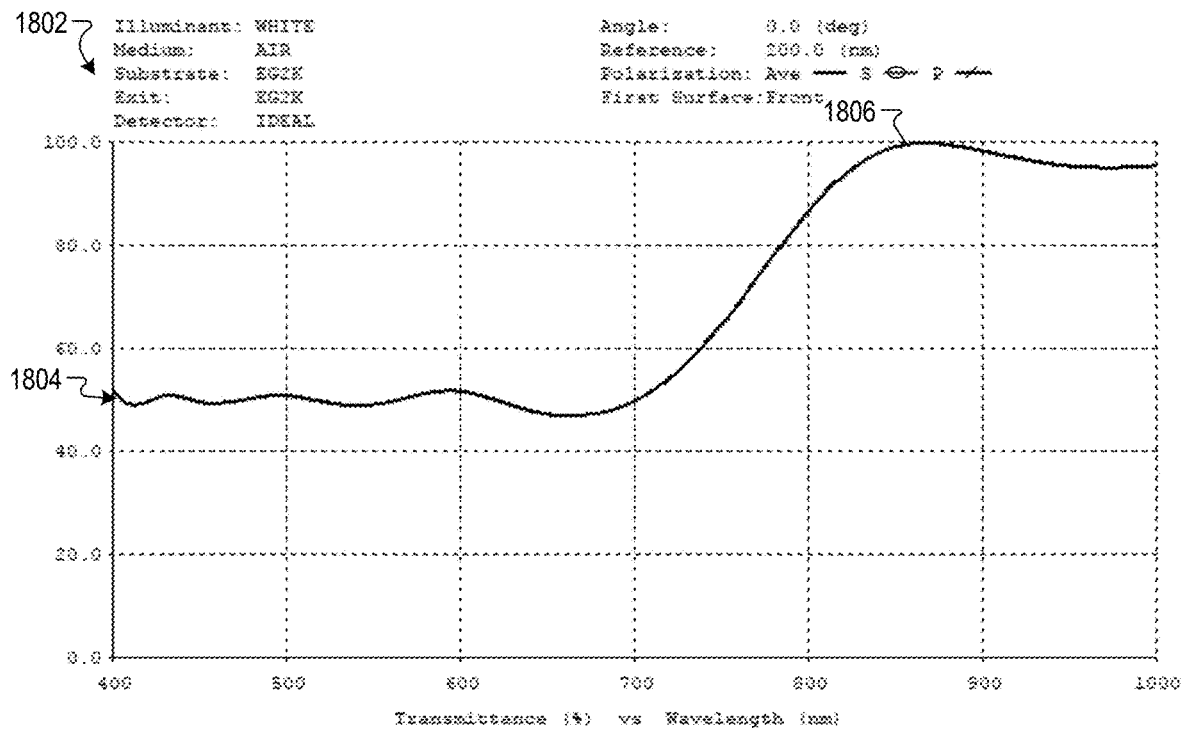
FIGS. 18A-18D are illustrations of example transmission performance for the optical assemblies described herein.

FIG. 18A depicts a graph 1802 illustrating a measured percentage of transmittance versus wavelength for an angle of incidence of zero degrees. An average polarization is shown by curve 1804 with a peak 1806 transmission shown at about 850 nanometers.

Figure 18B:
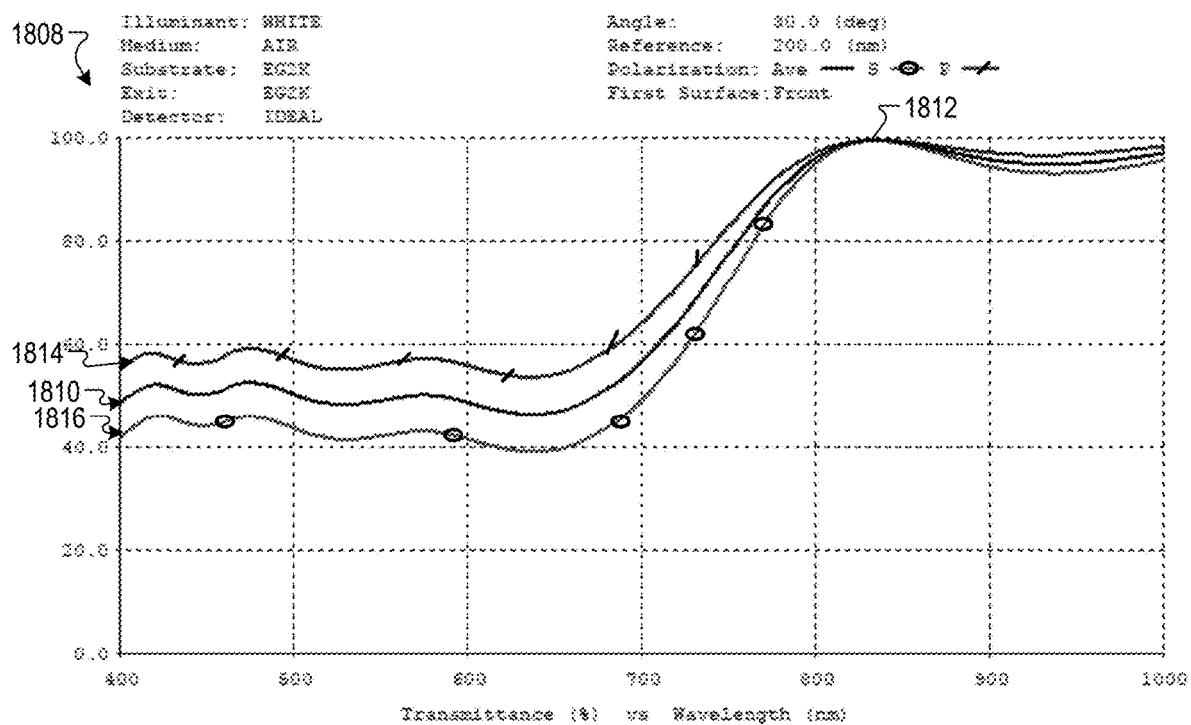

FIG. 18B depicts a graph 1808 illustrating a measured percentage of transmittance versus wavelength for an angle of incidence of 30 degrees. An average polarization is shown by curve 1810 with a peak 1812 transmission shown at about 840 nanometers. A p-polarization is shown by curve 1814. An s-polarization is shown by curve 1816.

Figure 18C:
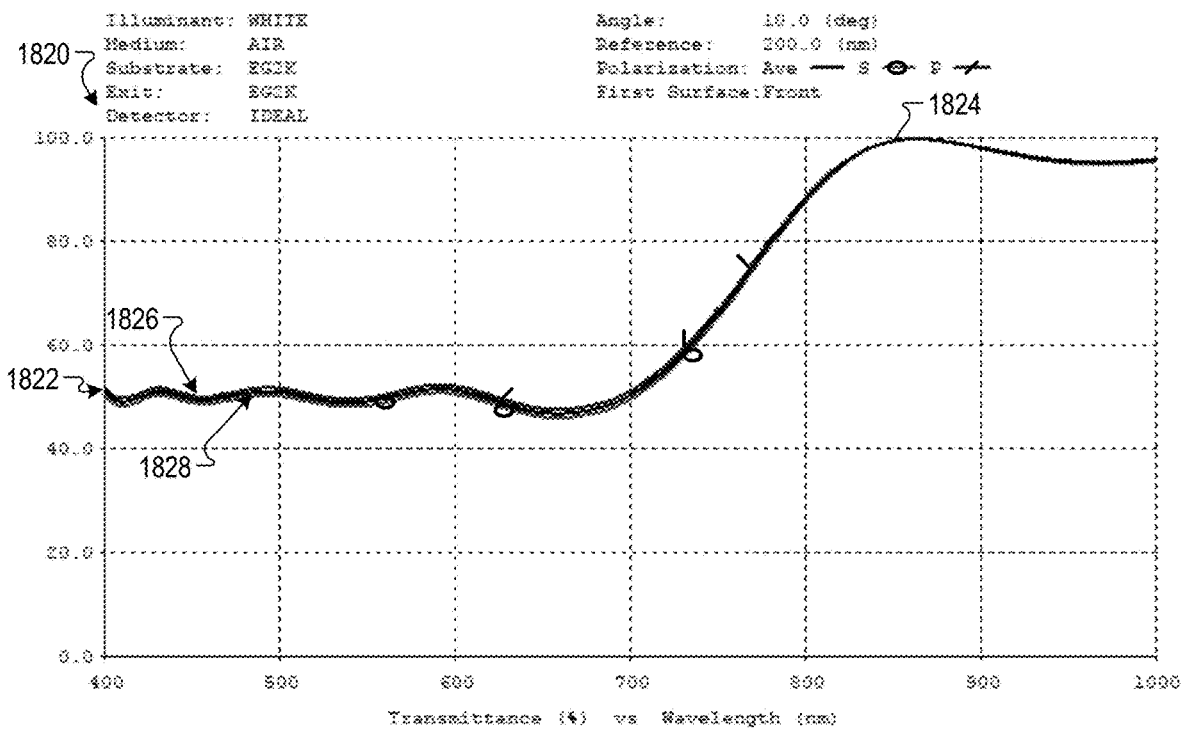

FIG. 18C depicts a graph 1820 illustrating a measured percentage of transmittance versus wavelength for an angle of incidence of 10 degrees. An average polarization is shown by curve 1822 with a peak 1824 transmission shown at about 850 nanometers. A p-polarization is shown by curve 1826. An s-polarization is shown by curve 1828.

Figure 18D:
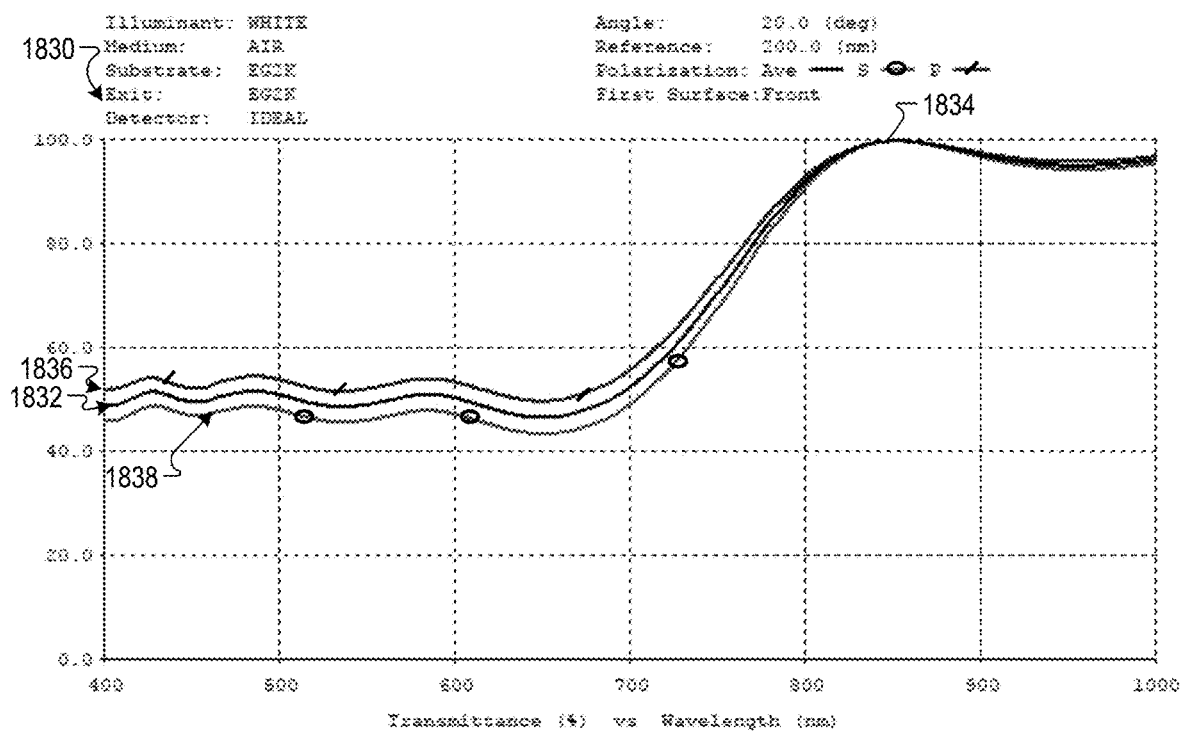

FIG. 18D depicts a graph 1830 illustrating a measured percentage of transmittance versus wavelength for an angle of incidence of 20 degrees. An average polarization is shown by curve 1832 with a peak 1834 transmission shown at about 850 nanometers. A p-polarization is shown by curve 1836. An s-polarization is shown by curve 1838.

Figure 19A:
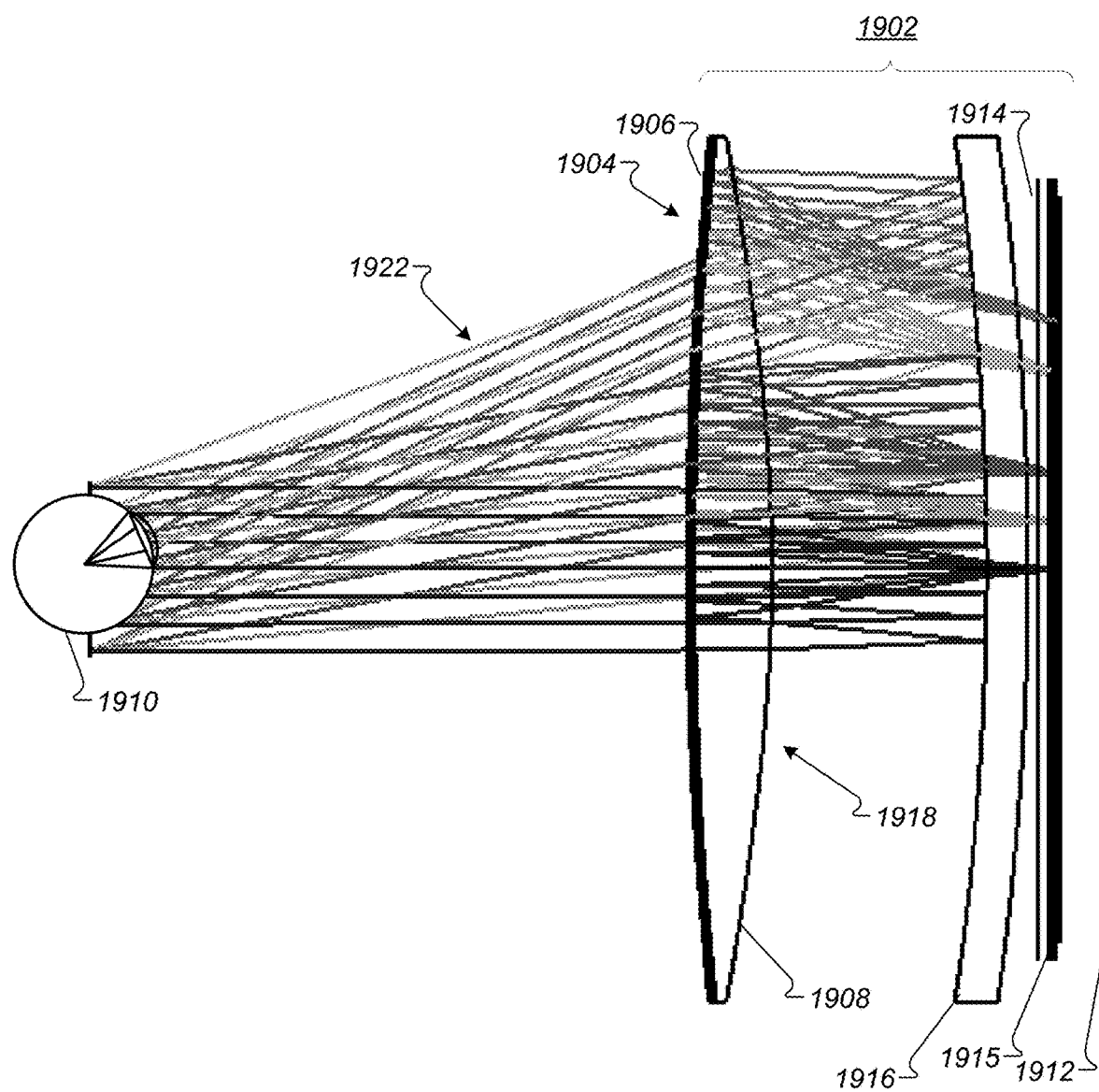
FIGS. 19A-19C are block diagrams of example of optical assemblies utilizing curved filter stacks usable with the example embodiments described herein.

FIG. 19A is a block diagram of an example optical assembly 1902 that may be housed in an HMD device. The HMD device may include at least one of optical assembly 1902 for each of two eyepieces in the HMD device. The optical assembly 1902 may include a curved filter stack assembly 1904. The curved filter stack assembly 1904 is biconvex in shape. The shape of the filter stack assembly 1904 may be selected to achieve improved optical performance of the optical assembly 1902 to, for example, increase image contrast and/or resolution for the HMD device that houses both assemblies 1902 and 1904. In some implementations, the filter stack assembly 1904 may include a concave (e.g., curved) lens 1906 coated or otherwise affixed to one or more filter stacks 1908.

As shown in FIG. 19A, an eye 1910 of a user is simulated to the left of the optical assembly 1902 while a display 1912 is shown to the right of the optical assembly 1902. The display 1912 may be an image projecting device operable to display image content to at least one eye-piece in the HMD housing the optical assembly 1902.

The optical assembly 1902 also includes a first filter stack 1914 and a display panel 1915 adjacent to a curved meniscus lens 1916. The curved lens 1916 may have a concave surface in a shape complementary to a surface 1918 of filter stack 1904. In some implementations, the curved lens 1916 may be composed of plastic and coated with a beam splitter layer.

The optical assembly 1902 can function to fold the optical path of light presented by display 1912 and through the filter stack 1904, curved lens 1916, and filter stack 1914. In this example, a number of example folded optical paths are shown at arrow 1922. The filter stack 1904 may also includes an IR filter coating on surface 1906 similar to the IR filters described above.

Figure 19B:
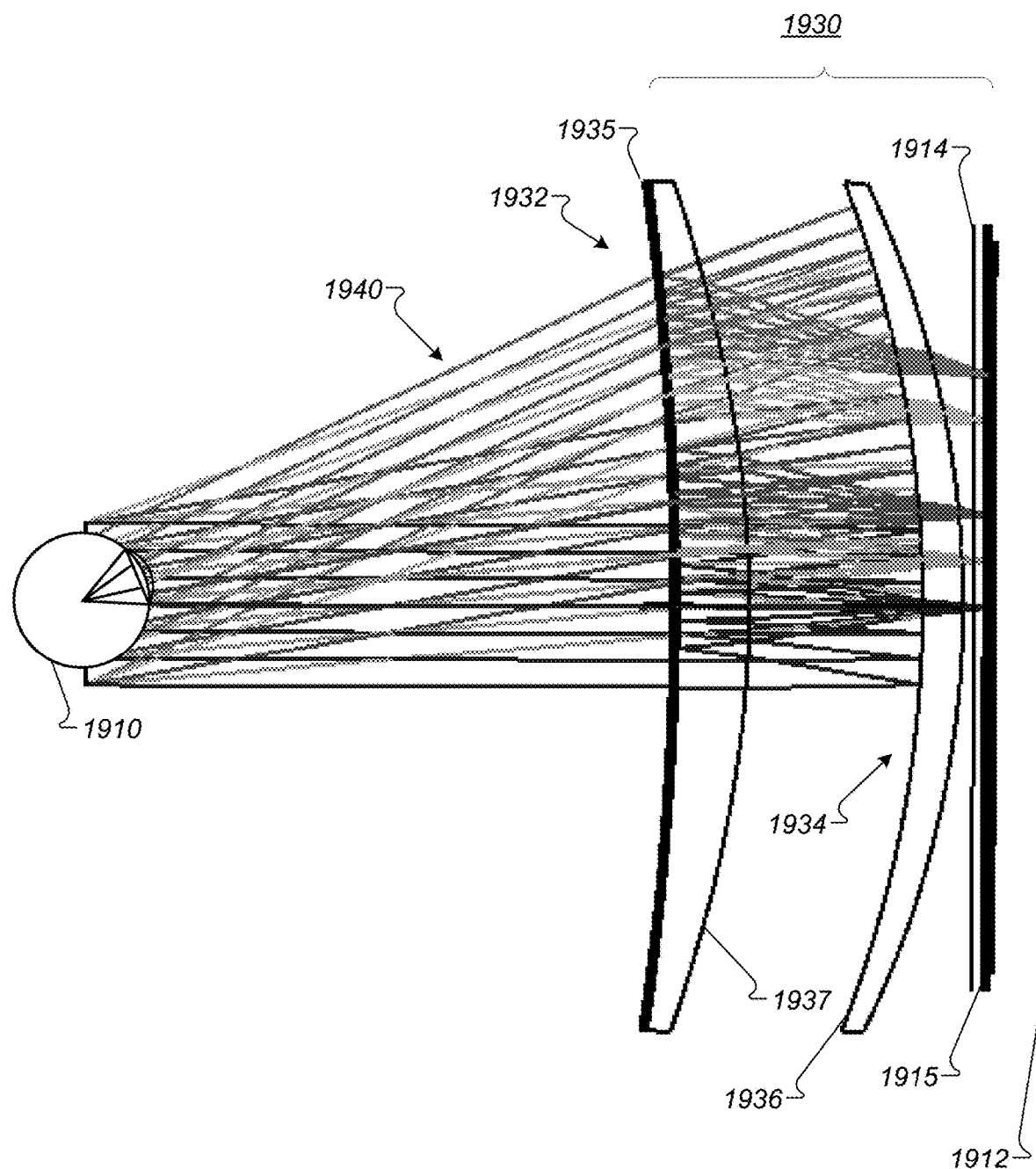

FIG. 19B is a block diagram of an example optical assembly 1930 that may be housed in an HMD device. The HMD device may include at least one of optical assembly 1930 for each of two eyepieces in the HMD device. The optical assembly 1930 may include a curved filter stack assembly 1932. The curved filter stack assembly 1932 in this example has a concave meniscus shape complementary to a surface 1934 of curved lens 1936. The shape of the filter stack assembly 1932 may be selected to achieve improved optical performance of the optical assembly 1930 to, for example, increase image contrast and/or resolution for the HMD device that houses both assemblies 1930 and 1932.

In some implementations, the lens 1936 may be coated or otherwise affixed to one or more curved filter stacks 1932. The filter stack assembly 1932 includes a lens coating 1933 on a first side of the filter stack 1952 and one or more additional filter layers on a second side 1937.

As shown in FIG. 19B, an eye 1910 of a user is simulated to the left of the optical assembly 1930 while a display 1912 is shown to the right of the optical assembly 1930. The display 1912 may be an image projecting device operable to display image content to at least one eye-piece in the HMD housing the optical assembly 1930.

The optical assembly 1930 also includes a first filter stack 1914 and a display panel 1915 adjacent to lens 1936. In some implementations, the lens 1936 may be composed of plastic and coated with a beam splitter layer.

The optical assembly 1930 can function to fold the optical path of light presented by display 1912 and through the filter stack 1914, the lens 1936, and the filter stack 1932. In this example, a number of example folded optical paths are shown at arrow 1940. The filter stack 1904 may also includes an IR filter coating on surface 1906 similar to the IR filters described above.

Figure 19C:
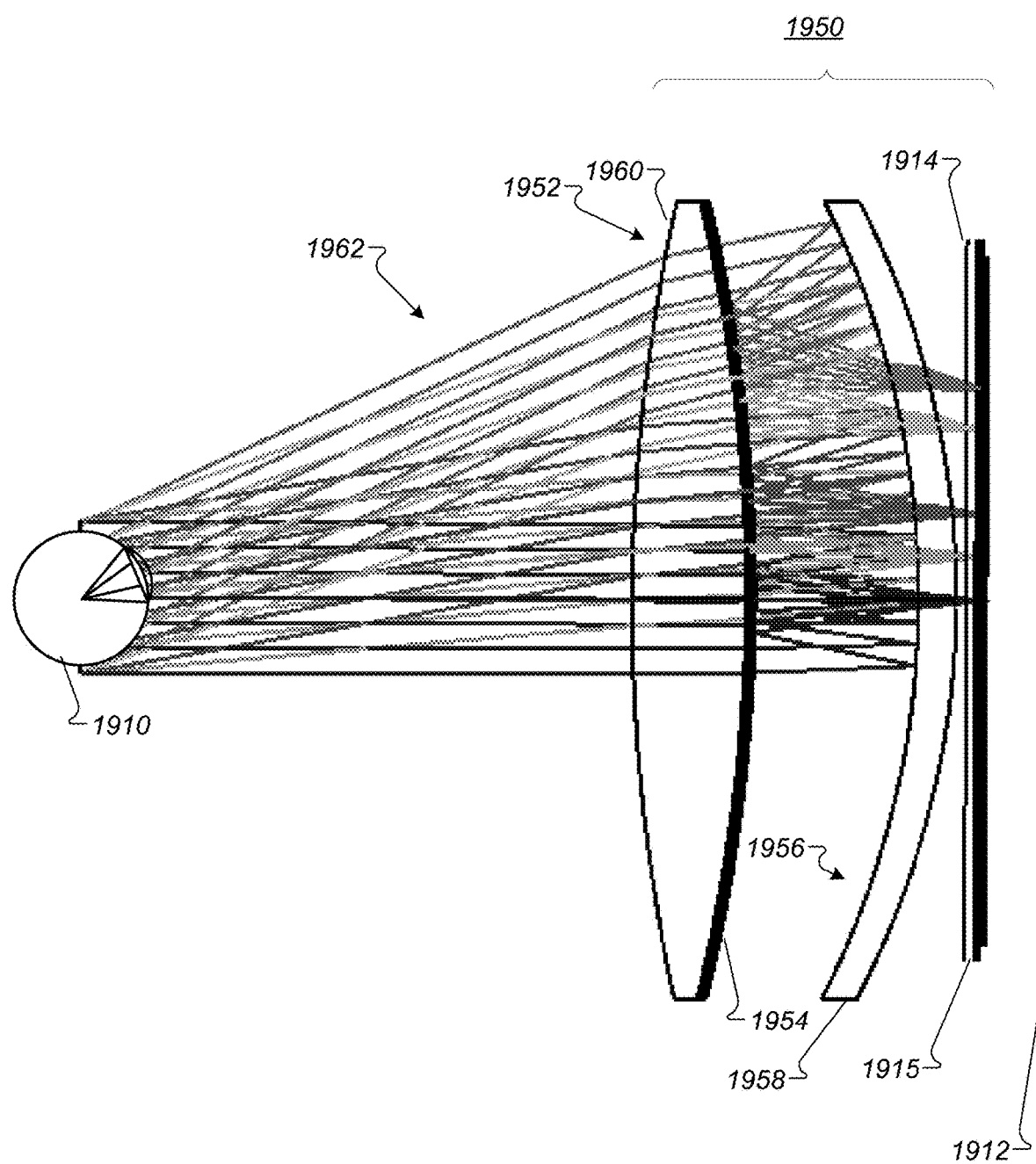

FIG. 19C is a block diagram of an example optical assembly 1950 that may be housed in an HMD device. The HMD device may include at least one of optical assembly 1950 for each of two eyepieces in the HMD device. The optical assembly 1950 may include a curved filter stack assembly 1952. The curved filter stack assembly 1952 in this example has a bi-convex shape complementary on a surface 1954 to a surface 1956 of curved lens 1958. The shape of the filter stack assembly 1952 may be selected to achieve improved optical performance of the optical assembly 1950 to, for example, increase image contrast and/or resolution for the HMD device that houses both assemblies 1950 and 1952.

In some implementations, the lens 1958 may be coated or otherwise affixed to one or more curved filter stacks 1952. The filter stack assembly 1952 includes a lens coating (on surface 1960) on assembly 1952 and one or more additional filter layers on the surface 1954.

As shown in FIG. 19C, an eye 1910 of a user is simulated to the left of the optical assembly 1950 while a display 1912 is shown to the right of the optical assembly 1950. The display 1912 may be an image projecting device operable to display image content to at least one eye-piece in the HMD housing the optical assembly 1950.

The optical assembly 1950 also includes a first filter stack 1914 and a display panel 1915 adjacent to lens 1958. In some implementations, the lens 1958 may be composed of plastic and coated with a beam splitter layer.

The optical assembly 1950 can function to fold the optical path of light presented by display 1912 and through the filter stack 1914, lens 1958, and filter stack 1952. In this example, a number of example folded optical paths are shown at arrow 1962. The filter stack 1952 may also includes an IR filter coating on surface 1960 similar to the IR filters described above.

Although not depicted, elements such as cameras, visors, additional lenses and/or coatings, and filters may be used with the assemblies depicted in FIGS. 19A-19D, as described in reference to FIGS. 7-9 and FIGS. 13-16. In some implementations, the filter stacks depicted in FIGS. 19A-19C may be un-curved (e.g., flat).

Although the components described throughout this disclosure may be shown and/or described as encapsulated/connected to other components, each component can be adhesively bound to adjacent components. Alternatively, each component can be mechanically connected, or frictionally bound to adjacent components. In other implementations, none of the components are bound or connected, but may function together as a unit housed in an assembly. In some implementations, portions of the components may be coated, while other portions remain uncoated. Lens devices shown throughout this disclosure may be standalone or integrated into a manufactured assembly. In addition, although only one lens is shown in particular diagrams, multiple lenses can be substituted. In addition, when one optical assembly is depicted, additional optical assemblies may be included in an HMD device. For example, optical assemblies can be duplicated with the HMD device to provide one optical assembly for each eyepiece.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A head-mounted display assembly comprising:
    an image projecting device operable to display image content to at least one eye-piece in the head-mounted display assembly; and
    an optical assembly including,
        at least one lens;
        a plurality of light sources placed in a perimeter surrounding the at least one lens, the plurality of light sources configured to direct light to an eye of a user accessing the head-mounted display assembly, the light including infrared light;
        a first filter stack disposed between the at least one lens and the image projecting device, the first filter stack including at least one beam splitting layer; and
        a second filter stack between the first filter stack and the at least one lens, the second filter stack including at least one reflective element that faces the at least one lens, the at least one lens configured to receive a reflection of the infrared light from the eye of the user; and
        a camera placed within the head mounted display assembly, the camera being configured to capture images of the infrared reflection of light through the at least one lens, the infrared light reflected by the at least one reflective element.

2. The head-mounted display assembly of claim 1, wherein the camera is placed beneath the at least one lens and aimed toward the image projecting device to capture an image of the eye of a user accessing the head-mounted display assembly, the image of the eye being reflected from the reflective element.

3. The head-mounted display assembly of claim 1, wherein the at least one lens is configured to slide laterally relative to a bottom plane of a frame housing the head-mounted display assembly, the slide being configured to trigger a diopter adjustment to correct a visual impairment associated with a user accessing the head-mounted display assembly.

4. The head-mounted display assembly of claim 1, wherein the reflective element is a reflective infrared (IR) filter coating on a side of the second filter stack facing the at least one lens.

5. The head-mounted display assembly of claim 1, wherein the reflective element is a reflective prism.

6. The head-mounted display assembly of claim 1, wherein the plurality of light sources include a plurality of light emitting diodes placed facing an eye of a user accessing the head mounted display assembly and placed in a perimeter surrounding the at least one lens.

7. The head-mounted display assembly of claim 1, wherein the first filter stack is adjacent to the second filter stack and configured into a single stacked arrangement between the at least one lens and a display panel, and wherein:
    the first filter stack includes a first linear polarizer, stacked between the display panel and a first quarter wave plate, the first quarter wave plate stacked between the first linear polarizer and a beam splitter; and
    the second filter stack includes a polarizing beam splitter stacked between a second quarter wave plate and a second linear polarizer, wherein the second linear polarizer includes the reflective element in a filter stack layer that faces the at least one lens.

8. An optical assembly including:
- at least one lens;
- a plurality of light sources placed in a perimeter surrounding the at least one lens, the plurality of light sources configured to direct light to an eye of a user accessing the optical assembly, the light including infrared light;
- a first filter stack disposed between the at least one lens and an image projecting device, the first filter stack including at least one beam splitting layer; and
- a second filter stack between the first filter stack and the at least one lens, the second filter stack including at least one reflective element that faces the at least one lens, the at least one lens configured to receive a reflection of the infrared light from the eye of the user; and
- a camera configured to capture images of the infrared light through the at least one lens, the infrared light reflected by the at least one reflective element.

9. The optical assembly of claim 8, wherein the camera is placed beneath the at least one lens and aimed toward the image projecting device to capture an image of the eye of a user accessing the assembly, the image of the eye being reflected from the reflective element.

10. The optical assembly of claim 8, wherein the at least one lens is configured to slide laterally relative to a bottom plane of a frame housing the assembly, the slide being configured to trigger a diopter adjustment to correct a visual impairment associated with a user accessing the assembly.

11. The optical assembly of claim 8, wherein the reflective element is a reflective infrared (IR) filter coating on a side of the second filter stack facing the at least one lens.

12. The optical assembly of claim 8, wherein the reflective element is a reflective prism.

13. The optical assembly of claim 8, wherein the plurality of light sources include a plurality of light emitting diodes placed facing an eye of a user accessing the assembly and placed in a perimeter surrounding the at least one lens.

14. The optical assembly of claim 8, wherein the first filter stack is adjacent to the second filter stack and configured into a single stacked arrangement between the at least one lens and a display panel, and wherein:
- the first filter stack includes a first linear polarizer, stacked between the display panel and a first quarter wave plate, the first quarter wave plate stacked between the first linear polarizer and a beam splitter; and
- the second filter stack includes a polarizing beam splitter stacked between a second quarter wave plate and a second linear polarizer, wherein the second linear polarizer includes the reflective element in a filter stack layer that faces the at least one lens.

* * * * *

UNITED STATES PATENT AND TRADEMARK OFFICE
CERTIFICATE OF CORRECTION

PATENT NO. : 11,347,061 B2
APPLICATION NO. : 16/718533
DATED : May 31, 2022
INVENTOR(S) : Bierhuizen et al.

Page 1 of 1

It is certified that error appears in the above-identified patent and that said Letters Patent is hereby corrected as shown below:

In the Claims

In Column 34, Claim 1, Line 27, delete "reflection of" after "infrared".

Signed and Sealed this
Third Day of January, 2023

Katherine Kelly Vidal
*Director of the United States Patent and Trademark Office*